United States Patent
Hsu et al.

(10) Patent No.: US 9,274,317 B2
(45) Date of Patent: Mar. 1, 2016

(54) OPTICAL IMAGING LENS AND ELECTRONIC DEVICE COMPRISING THE SAME

(71) Applicants: Sheng-Wei Hsu, Taichung (TW); Tzu-Chien Tang, Taichung (TW)

(72) Inventors: Sheng-Wei Hsu, Taichung (TW); Tzu-Chien Tang, Taichung (TW)

(73) Assignee: Genius Electronics Opticals Co., Ltd., Central Taiwan Science Park, Daya District, Taichung (TW)

( * ) Notice: Subject to any disclaimer, the term of this patent is extended or adjusted under 35 U.S.C. 154(b) by 0 days.

(21) Appl. No.: 14/465,830

(22) Filed: Aug. 22, 2014

(65) Prior Publication Data

US 2015/0362701 A1 Dec. 17, 2015

(30) Foreign Application Priority Data

Jun. 17, 2014 (TW) .............................. 103120901 A

(51) Int. Cl.
| | | |
|---|---|---|
| *G02B 13/00* | (2006.01) | |
| *G02B 9/62* | (2006.01) | |
| *H04N 5/225* | (2006.01) | |

(52) U.S. Cl.
CPC .............. *G02B 13/0045* (2013.01); *G02B 9/62* (2013.01); *G02B 13/00* (2013.01); *H04N 5/2252* (2013.01); *H04N 5/2253* (2013.01)

(58) Field of Classification Search
CPC .................................. G02B 13/00; G02B 9/62
USPC .......................................... 359/713, 757, 758
See application file for complete search history.

(56) References Cited

U.S. PATENT DOCUMENTS

| 7,830,620 | B2 | 11/2010 | Asami | |
|---|---|---|---|---|
| 8,514,499 | B2 | 8/2013 | Hsu | |
| 8,643,957 | B2 | 2/2014 | Chen | |
| 2013/0070346 | A1* | 3/2013 | Hsu et al. ...................... | 359/713 |
| 2013/0235473 | A1* | 9/2013 | Chen et al. .................... | 359/713 |
| 2014/0098239 | A1* | 4/2014 | Jeong ........................... | 348/164 |

FOREIGN PATENT DOCUMENTS

| CN | 202975455 | 6/2013 |
|---|---|---|
| TW | 201333575 | 8/2013 |
| TW | 201337320 | 9/2013 |
| TW | 201348789 | 12/2013 |
| TW | 201350901 | 12/2013 |
| TW | 201400854 | 1/2014 |
| TW | 201400855 | 1/2014 |
| TW | 201413284 | 4/2014 |

* cited by examiner

*Primary Examiner* — Bumsuk Won
*Assistant Examiner* — William R Alexander
(74) *Attorney, Agent, or Firm* — Winston Hsu; Scott Margo

(57) ABSTRACT

An optical imaging lens includes: first through sixth lens elements, the first lens element has a positive refracting power, an object-side surface with a convex part in a vicinity of the optical axis, and a convex part in a vicinity of its periphery, the second lens element has a negative refracting power and an object-side surface with a convex part in a vicinity of its periphery, the third lens element and the fourth lens element each have an image-side surface with a convex part in a vicinity of the optical axis, the fifth lens element has an object-side surface with a convex part in a vicinity of the optical axis, the sixth lens element has an image-side surface with a concave part in a vicinity of the optical axis, and the optical imaging lens set includes no lens element with refractive power other than said first through sixth lens elements.

16 Claims, 22 Drawing Sheets

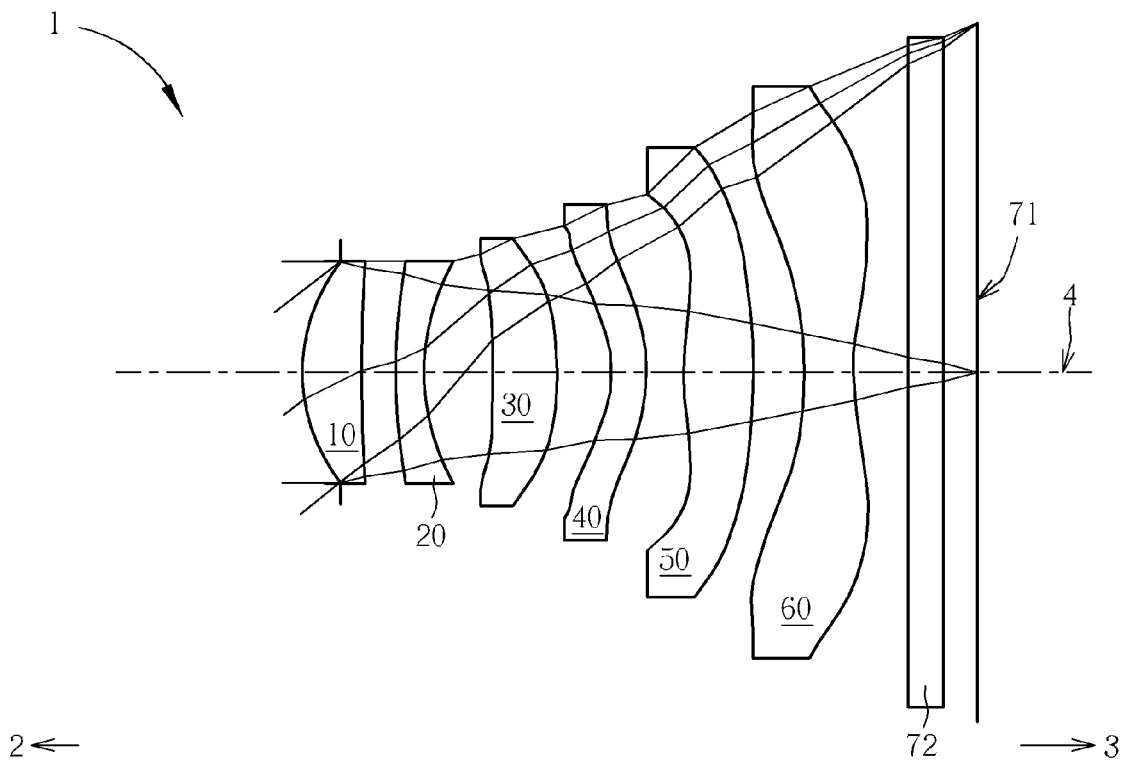
FIG. 5
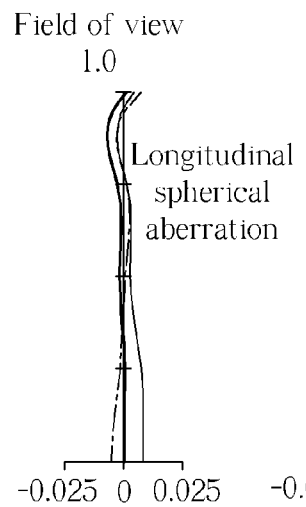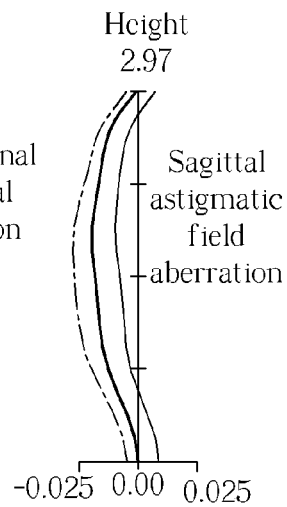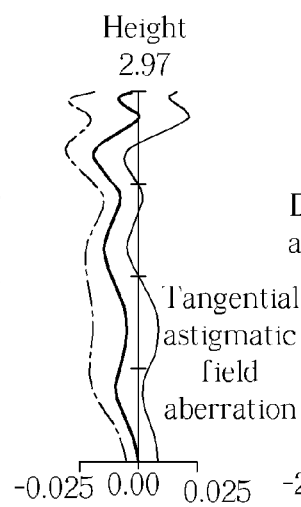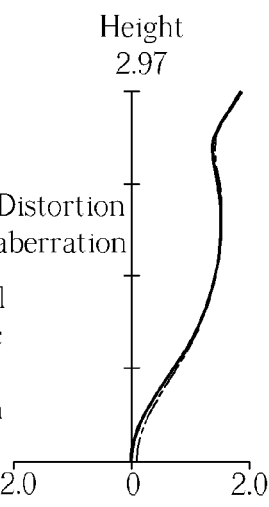
FIG. 6A    FIG. 6B    FIG. 6C    FIG. 6D

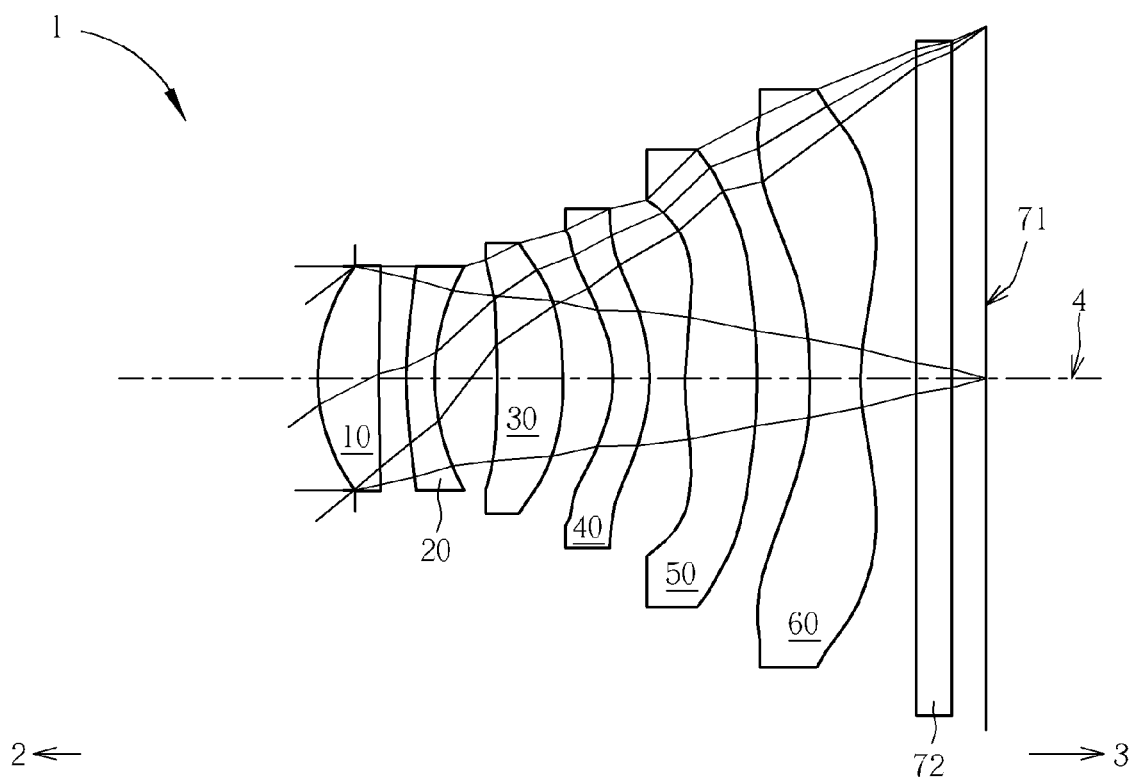
FIG. 7
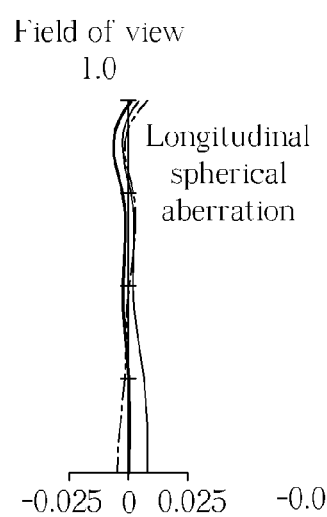 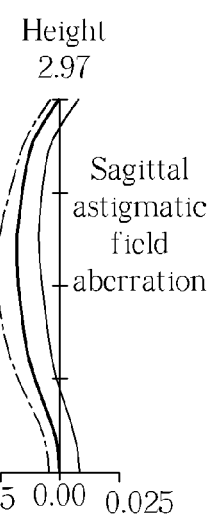 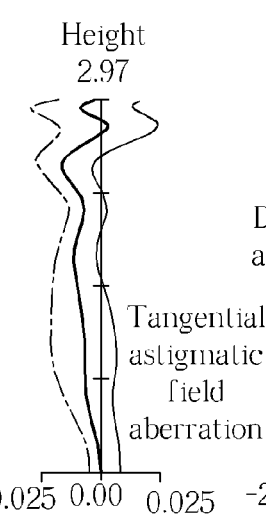 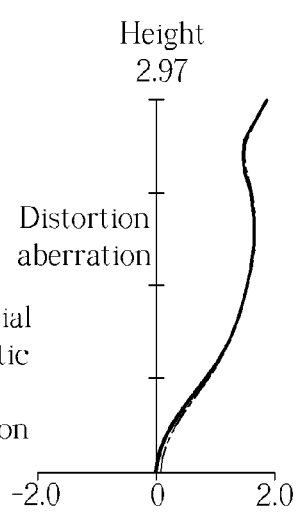
FIG. 8A     FIG. 8B     FIG. 8C     FIG. 8D

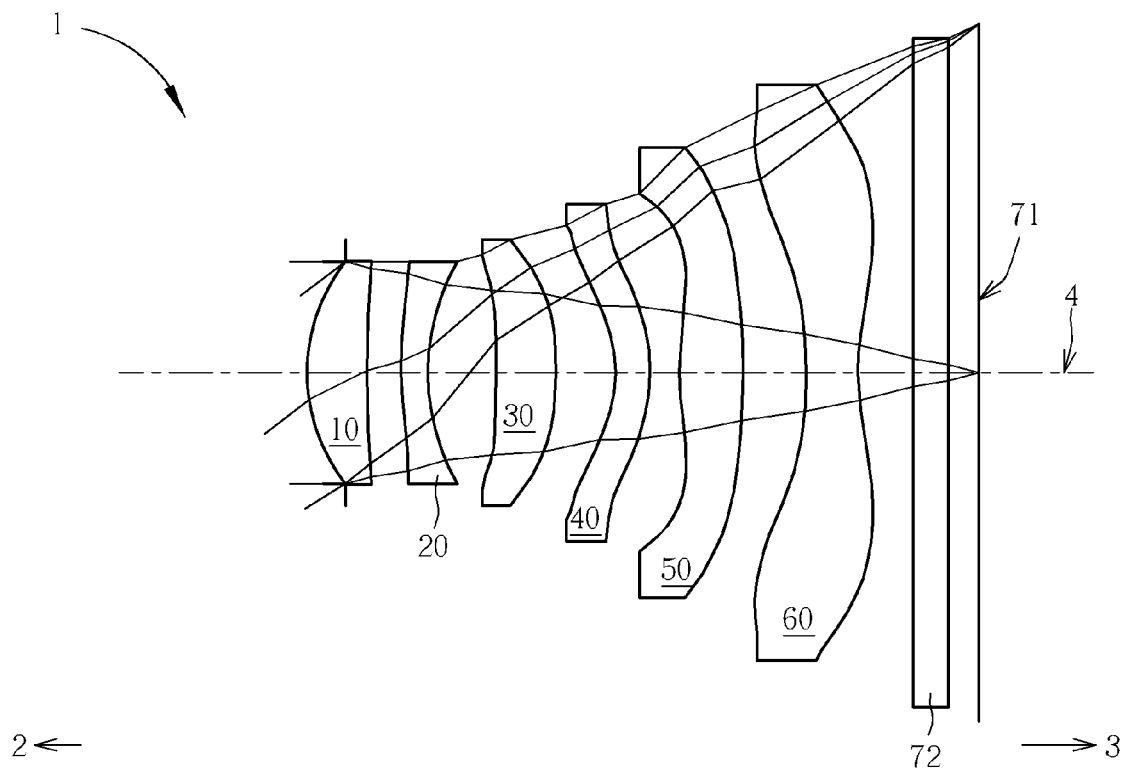
FIG. 9
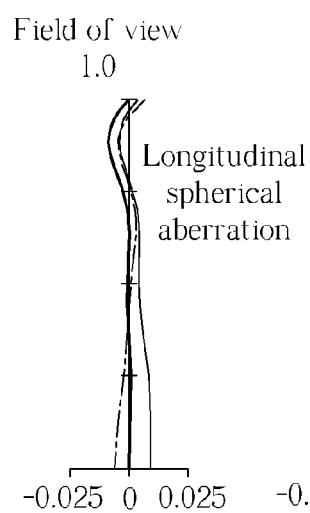 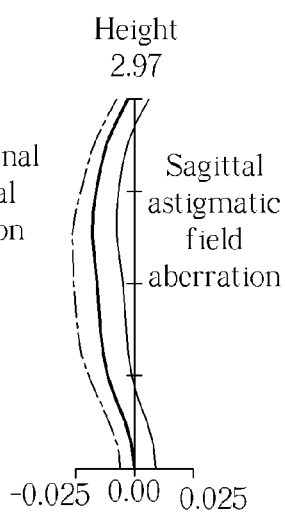 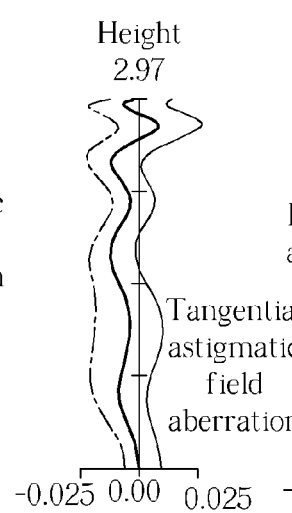 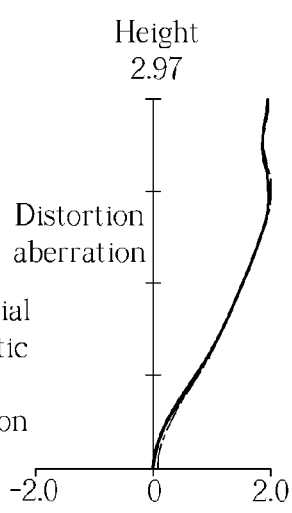
FIG. 10A    FIG. 10B    FIG. 10C    FIG. 10D

| First Example | | | | | | |
|---|---|---|---|---|---|---|
| EFL(Effective Focal Length)= 3.840 mm., HFOV(Half Field Of View)= 37.18 deg., Total Length=4.773mm., Fno= 2.05 | | | | | | |
| No. | | Curvature Radius | Ape. Stop Distance Lens Thickness Air Gap | Refractive Index | Abbe No. | Focal Length | Material |
| | Object | infinity | infinity | | | | |
| 80 | Ape. Stop | infinity | -0.3145 | | | | |
| 11 | First Lens | 1.6003 | 0.4958 | 1.546 | 56.114 | 3.543 | Plastic |
| 12 | | 8.2534 | 0.0826 | | | | |
| 21 | Second Lens | 2.5004 | 0.2427 | 1.647 | 22.440 | -8.270 | Plastic |
| 22 | | 1.6390 | 0.4282 | | | | |
| 31 | Third Lens | -76.7399 | 0.5659 | 1.546 | 56.114 | 5.410 | Plastic |
| 32 | | -2.8512 | 0.2886 | | | | |
| 41 | Fourth Lens | -1.0052 | 0.3172 | 1.647 | 22.440 | -6.254 | Plastic |
| 42 | | -1.5033 | 0.0654 | | | | |
| 51 | Fifth Lens | 2.3674 | 0.4974 | 1.546 | 56.114 | 3.059 | Plastic |
| 52 | | -5.2474 | 0.2245 | | | | |
| 61 | Sixth Lens | -4.7587 | 0.4440 | 1.546 | 56.114 | -2.636 | Plastic |
| 62 | | 2.1306 | 0.4789 | | | | |
| 72 | Filter | infinity | 0.3000 | | | | |
| | Filter -Image Plane | infinity | 0.3419 | | | | |
| 71 | Image Plane | infinity | 0 | | | | |

FIG. 16

| No. | 11 | 12 | 21 | 22 | 31 | 32 |
|---|---|---|---|---|---|---|
| K | 0 | 0 | 0 | 0 | 0 | 0.612607 |
| a4 | 0.0059404 | -0.1472656 | -0.3020896 | -0.1909797 | -0.0649912 | -0.0164885 |
| a6 | 0.0246291 | 0.3711886 | 0.5122464 | 0.2683209 | -0.2072441 | -0.1776837 |
| a8 | -0.035431 | -0.5370734 | -0.6629521 | -0.2629633 | 0.5907029 | -0.1164212 |
| a10 | 0.0386211 | 0.4589831 | 0.5650821 | 0.2304901 | -1.0918847 | 1.0904758 |
| a12 | -0.0084983 | -0.1705542 | -0.2374249 | -0.0758401 | 0.973135 | -2.0596941 |
| a14 | 0 | 0 | 0 | 0 | -0.2857625 | 1.9422522 |
| a16 | 0 | 0 | 0 | 0 | -0.0003244 | -0.9244577 |
| a18 | 0 | 0 | 0 | 0 | 0 | 0.1767094 |
| a20 | 0 | 0 | 0 | 0 | 0 | 0 |
| No. | 41 | 42 | 51 | 52 | 61 | 62 |
| K | -1 | -1 | 0 | 0 | 0 | -1 |
| a4 | 0.5442778 | 0.1501444 | -0.293282491 | 0.014116668 | -0.098318698 | -0.183861589 |
| a6 | -1.5687792 | -0.5343704 | 0.261908695 | 0.064050342 | 0.059255621 | 0.087863157 |
| a8 | 3.1595572 | 0.9945255 | -0.214886262 | -0.109576152 | -0.017096986 | -0.033676951 |
| a10 | -3.9923145 | -0.8973702 | 0.092023423 | 0.069373908 | 0.00414802 | 0.008918909 |
| a12 | 3.373444 | 0.4020465 | -0.020732791 | -0.023831978 | -0.000818653 | -0.001555389 |
| a14 | -1.8451572 | -0.0199013 | 0.001947277 | 0.004785337 | 9.77388E-05 | 0.000157798 |
| a16 | 0.5850709 | -0.0642644 | 5.51553E-05 | -0.000534816 | -4.90222E-06 | -6.83084E-06 |
| a18 | -0.0819389 | 0.0262893 | -1.44162E-05 | 2.56633E-05 | 0 | 0 |
| a20 | 0 | -0.0033135 | 0 | 0 | 0 | 0 |

FIG. 17

| Second Example ||||||||
|---|---|---|---|---|---|---|---|
| EFL(Effective Focal Length)=3.826 mm., HFOV(Half Field Of View)= 37.28 deg., Total Length=4.748mm., Fno= 2.05 ||||||||
| No. | | Curvature Radius | Ape. Stop Distance Lens Thickness Air Gap | Refractive Index | Abbe No. | Focal Length | Material |
| | Object | infinity | infinity | | | | |
| 80 | Ape. Stop | infinity | -0.3123 | | | | |
| 11 | First Lens | 1.5999 | 0.4954 | 1.546 | 56.114 | 3.517 | Plastic |
| 12 | | 8.5426 | 0.0807 | | | | |
| 21 | Second Lens | 2.6355 | 0.2400 | 1.647 | 22.440 | -8.250 | Plastic |
| 22 | | 1.7012 | 0.4278 | | | | |
| 31 | Third Lens | -54.9095 | 0.5644 | 1.546 | 56.114 | 5.523 | Plastic |
| 32 | | -2.8687 | 0.2952 | | | | |
| 41 | Fourth Lens | -1.0291 | 0.3178 | 1.647 | 22.440 | -6.385 | Plastic |
| 42 | | -1.5369 | 0.0600 | | | | |
| 51 | Fifth Lens | 2.4306 | 0.5031 | 1.546 | 56.114 | 3.136 | Plastic |
| 52 | | -5.3659 | 0.2800 | | | | |
| 61 | Sixth Lens | -4.5003 | 0.4106 | 1.546 | 56.114 | -2.619 | Plastic |
| 62 | | 2.1629 | 0.4789 | | | | |
| 72 | Filter | infinity | 0.3000 | | | | |
| | Filter -Image Plane | infinity | 0.2939 | | | | |
| 71 | Image Plane | infinity | 0 | | | | |

FIG. 18

| No. | 11 | 12 | 21 | 22 | 31 | 32 |
|---|---|---|---|---|---|---|
| K | 0 | 0 | 0 | 0 | 0 | 0.612607 |
| a4 | 0.0059316 | -0.1466794 | -0.3005866 | -0.1882437 | -0.0698979 | -0.0201747 |
| a6 | 0.0256623 | 0.3705746 | 0.5142281 | 0.2693986 | -0.2110635 | -0.1808631 |
| a8 | -0.0355328 | -0.536629 | -0.6611981 | -0.2627119 | 0.5901118 | -0.116814 |
| a10 | 0.0379073 | 0.4605514 | 0.5639695 | 0.2307973 | -1.091519 | 1.0907361 |
| a12 | -0.0078238 | -0.1724508 | -0.2376803 | -0.0735974 | 0.972644 | -2.0592737 |
| a14 | 0 | 0 | 0 | 0 | -0.2847973 | 1.9424855 |
| a16 | 0 | 0 | 0 | 0 | -0.0003244 | -0.9245601 |
| a18 | 0 | 0 | 0 | 0 | 0 | 0.1762958 |
| a20 | 0 | 0 | 0 | 0 | 0 | 0 |
| No. | 41 | 42 | 51 | 52 | 61 | 62 |
| K | -1 | -1 | 0 | 0 | 0 | -1 |
| a4 | 0.5372899 | 0.1498007 | -0.283735918 | 0.021146282 | -0.098029688 | -0.184264353 |
| a6 | -1.5703809 | -0.536641 | 0.262846963 | 0.062883625 | 0.059308551 | 0.088238827 |
| a8 | 3.1597574 | 0.9943576 | -0.216770885 | -0.10970505 | -0.017098011 | -0.033676422 |
| a10 | -3.9918452 | -0.8972676 | 0.092504283 | 0.069386731 | 0.004147372 | 0.008913335 |
| a12 | 3.3736111 | 0.4021182 | -0.020636528 | -0.023823848 | -0.000818801 | -0.001556056 |
| a14 | -1.8451549 | -0.0198761 | 0.00191338 | 0.004786936 | 9.77268E-05 | 0.00015779 |
| a16 | 0.58503 | -0.0642601 | 4.09625E-05 | -0.000534843 | -4.89708E-06 | -6.81601E-06 |
| a18 | -0.0819812 | 0.0262882 | -1.16504E-05 | 2.55056E-05 | 0 | 0 |
| a20 | 0 | -0.0033149 | 0 | 0 | 0 | 0 |

FIG. 19

| Third Example | | | | | | |
|---|---|---|---|---|---|---|
| EFL(Effective Focal Length)= 3.843 mm., HFOV(Half Field Of View)= 37.19 deg., Total Length=4.766mm., Fno= 2.05 | | | | | | |
| No. | | Curvature Radius | Ape. Stop Distance Lens Thickness Air Gap | Refractive Index | Abbe No. | Focal Length | Material |
| | Object | infinity | infinity | | | | |
| 80 | Ape. Stop | infinity | -0.3164 | | | | |
| 11 | First Lens | 1.5936 | 0.4999 | 1.546 | 56.114 | 3.496 | Plastic |
| 12 | | 8.5821 | 0.0809 | | | | |
| 21 | Second Lens | 2.6298 | 0.2414 | 1.647 | 22.440 | -8.248 | Plastic |
| 22 | | 1.6981 | 0.4317 | | | | |
| 31 | Third Lens | -62.2927 | 0.5536 | 1.546 | 56.114 | 5.519 | Plastic |
| 32 | | -2.8830 | 0.2973 | | | | |
| 41 | Fourth Lens | -1.0250 | 0.2975 | 1.647 | 22.440 | -6.161 | Plastic |
| 42 | | -1.5372 | 0.0703 | | | | |
| 51 | Fifth Lens | 2.5359 | 0.5921 | 1.546 | 56.114 | 3.041 | Plastic |
| 52 | | -4.4102 | 0.2184 | | | | |
| 61 | Sixth Lens | -4.3952 | 0.4204 | 1.546 | 56.114 | -2.542 | Plastic |
| 62 | | 2.0962 | 0.4789 | | | | |
| 72 | Filter | infinity | 0.3000 | | | | |
| | Filter -Image Plane | infinity | 0.2833 | | | | |
| 71 | Image Plane | infinity | 0 | | | | |

FIG. 20

| No. | 11 | 12 | 21 | 22 | 31 | 32 |
|---|---|---|---|---|---|---|
| K | 0 | 0 | 0 | 0 | 0 | 0.612607 |
| a4 | 0.0056727 | -0.1468511 | -0.299859 | -0.1867211 | -0.0701463 | -0.0240902 |
| a6 | 0.0253348 | 0.3698943 | 0.5145113 | 0.2690301 | -0.2118093 | -0.180947 |
| a8 | -0.0352793 | -0.536264 | -0.6624659 | -0.2600388 | 0.5908999 | -0.1166827 |
| a10 | 0.036449 | 0.459471 | 0.5659906 | 0.229203 | -1.0930894 | 1.0905558 |
| a12 | -0.0070743 | -0.1706362 | -0.2369806 | -0.0727789 | 0.9707881 | -2.0592612 |
| a14 | 0 | 0 | 0 | 0 | -0.2818869 | 1.9426801 |
| a16 | 0 | 0 | 0 | 0 | -0.0003244 | -0.9243653 |
| a18 | 0 | 0 | 0 | 0 | 0 | 0.1764364 |
| a20 | 0 | 0 | 0 | 0 | 0 | 0 |
| No. | 41 | 42 | 51 | 52 | 61 | 62 |
| K | -1 | -1 | 0 | 0 | 0 | -1 |
| a4 | 0.5344416 | 0.1532464 | -0.288307469 | 0.019832874 | -0.097311167 | -0.187249714 |
| a6 | -1.5681446 | -0.538319 | 0.262832502 | 0.064816724 | 0.059255097 | 0.088961672 |
| a8 | 3.1601447 | 0.9944099 | -0.218194786 | -0.109686545 | -0.017102299 | -0.03370393 |
| a10 | -3.9919516 | -0.8972144 | 0.09333474 | 0.069334458 | 0.004147385 | 0.008905078 |
| a12 | 3.3734525 | 0.4021255 | -0.020549382 | -0.023824567 | -0.000818727 | -0.001556595 |
| a14 | -1.845233 | -0.0198788 | 0.001853175 | 0.004787906 | 9.77412E-05 | 0.00015783 |
| a16 | 0.5850378 | -0.0642622 | 2.24579E-05 | -0.00053475 | -4.89596E-06 | -6.79478E-06 |
| a18 | -0.0819304 | 0.0262886 | -5.22652E-06 | 2.54722E-05 | 0 | 0 |
| a20 | 0 | -0.0033146 | 0 | 0 | 0 | 0 |

FIG. 21

| Fourth Example ||||||||
|---|---|---|---|---|---|---|---|
| EFL(Effective Focal Length)= 3.830 mm., HFOV(Half Field Of View)= 37.28 deg., Total Length=4.769mm., Fno= 2.05 ||||||||
| No. | | Curvature Radius | Ape. Stop Distance Lens Thickness Air Gap | Refractive Index | Abbe No. | Focal Length | Material |
| | Object | infinity | infinity | | | | |
| 80 | Ape. Stop | infinity | -0.3150 | | | | |
| 11 | First Lens | 1.5858 | 0.5000 | 1.546 | 56.114 | 3.477 | Plastic |
| 12 | | 8.5642 | 0.0820 | | | | |
| 21 | Second Lens | 2.6624 | 0.2428 | 1.647 | 22.440 | -8.207 | Plastic |
| 22 | | 1.7097 | 0.4225 | | | | |
| 31 | Third Lens | -81.4888 | 0.5607 | 1.546 | 56.114 | 5.352 | Plastic |
| 32 | | -2.8274 | 0.2947 | | | | |
| 41 | Fourth Lens | -1.0305 | 0.3076 | 1.647 | 22.440 | -6.137 | Plastic |
| 42 | | -1.5549 | 0.0714 | | | | |
| 51 | Fifth Lens | 2.5159 | 0.6121 | 1.546 | 56.114 | 3.029 | Plastic |
| 52 | | -4.4096 | 0.1761 | | | | |
| 61 | Sixth Lens | -4.5084 | 0.4346 | 1.546 | 56.114 | -2.510 | Plastic |
| 62 | | 2.0358 | 0.4789 | | | | |
| 72 | Filter | infinity | 0.3000 | | | | |
| | Filter -Image Plane | infinity | 0.2854 | | | | |
| 71 | Image Plane | infinity | 0 | | | | |

FIG. 22

| No. | 11 | 12 | 21 | 22 | 31 | 32 |
|---|---|---|---|---|---|---|
| K | 0 | 0 | 0 | 0 | 0 | 0.612607 |
| a4 | 0.0053905 | -0.1475077 | -0.298842 | -0.1852912 | -0.0687654 | -0.0232874 |
| a6 | 0.0252473 | 0.3697907 | 0.5145551 | 0.2711051 | -0.2120477 | -0.1803406 |
| a8 | -0.0352734 | -0.5364807 | -0.6617824 | -0.2616461 | 0.5916171 | -0.115575 |
| a10 | 0.0363979 | 0.4606258 | 0.5657115 | 0.229317 | -1.0929395 | 1.0906904 |
| a12 | -0.0071062 | -0.1713395 | -0.2367597 | -0.0709998 | 0.9703857 | -2.0593506 |
| a14 | 0 | 0 | 0 | 0 | -0.28087 | 1.9426954 |
| a16 | 0 | 0 | 0 | 0 | -0.0003241 | -0.9243044 |
| a18 | 0 | 0 | 0 | 0 | 0 | 0.1764341 |
| a20 | 0 | 0 | 0 | 0 | 0 | 0 |
| No. | 41 | 42 | 51 | 52 | 61 | 62 |
| K | -1 | -1 | 0 | 0 | 0 | -1 |
| a4 | 0.5315167 | 0.1527346 | -0.292178454 | 0.018688685 | -0.097169384 | -0.189845762 |
| a6 | -1.5679374 | -0.5392924 | 0.261910852 | 0.065214603 | 0.059177653 | 0.089531656 |
| a8 | 3.1604361 | 0.9944238 | -0.217692461 | -0.109780934 | -0.017107503 | -0.033720431 |
| a10 | -3.991734 | -0.8971532 | 0.09371227 | 0.069314413 | 0.004147415 | 0.008898356 |
| a12 | 3.373441 | 0.4021573 | -0.020692075 | -0.02382029 | -0.000818675 | -0.001557205 |
| a14 | -1.8453019 | -0.0198695 | 0.001769119 | 0.004789375 | 9.77453E-05 | 0.000157838 |
| a16 | 0.5850008 | -0.0642614 | 1.62603E-05 | -0.00053456 | -4.8973E-06 | -6.77883E-06 |
| a18 | -0.0819347 | 0.0262874 | 9.68393E-06 | 2.5451E-05 | 0 | 0 |
| a20 | 0 | -0.0033154 | 0 | 0 | 0 | 0 |

FIG. 23

| No. | | Curvature Radius | Ape. Stop Distance Lens Thickness Air Gap | Refractive Index | Abbe No. | Focal Length | Material |
|---|---|---|---|---|---|---|---|
| Fifth Example | | | | | | | |
| EFL(Effective Focal Length)= 3.865 mm., HFOV(Half Field Of View)= 37.00 deg., Total Length=4.751mm., Fno= 2.05 | | | | | | | |
| | Object | infinity | infinity | | | | |
| 80 | Ape. Stop | infinity | -0.3255 | | | | |
| 11 | First Lens | 1.5770 | 0.5125 | 1.546 | 56.114 | 3.476 | Plastic |
| 12 | | 8.2627 | 0.0782 | | | | |
| 21 | Second Lens | 2.7760 | 0.2300 | 1.647 | 22.440 | -8.175 | Plastic |
| 22 | | 1.7612 | 0.4493 | | | | |
| 31 | Third Lens | -25.0584 | 0.5129 | 1.546 | 56.114 | 5.579 | Plastic |
| 32 | | -2.7355 | 0.3588 | | | | |
| 41 | Fourth Lens | -1.0220 | 0.2964 | 1.647 | 22.440 | -6.606 | Plastic |
| 42 | | -1.4964 | 0.0659 | | | | |
| 51 | Fifth Lens | 2.5158 | 0.5436 | 1.546 | 56.114 | 3.224 | Plastic |
| 52 | | -5.4143 | 0.2164 | | | | |
| 61 | Sixth Lens | -4.7196 | 0.4452 | 1.546 | 56.114 | -2.585 | Plastic |
| 62 | | 2.0797 | 0.4789 | | | | |
| 72 | Filter | infinity | 0.3000 | | | | |
| | Filter -Image Plane | infinity | 0.2625 | | | | |
| 71 | Image Plane | infinity | 0 | | | | |

FIG. 24

| No. | 11 | 12 | 21 | 22 | 31 | 32 |
|---|---|---|---|---|---|---|
| K | 0 | 0 | 0 | 0 | 0 | 0.612607 |
| a4 | 0.0054941 | -0.1465691 | -0.2991802 | -0.1810814 | -0.0745643 | -0.034177 |
| a6 | 0.0263368 | 0.3643981 | 0.5134578 | 0.2743147 | -0.2212609 | -0.1592007 |
| a8 | -0.0364772 | -0.5270875 | -0.6518692 | -0.2609542 | 0.5940273 | -0.1290756 |
| a10 | 0.0372731 | 0.4534435 | 0.5547832 | 0.2299262 | -1.0713395 | 1.067897 |
| a12 | -0.0074266 | -0.1701059 | -0.2328444 | -0.0679106 | 0.9508409 | -2.0096837 |
| a14 | 0 | 0 | 0 | -0.002058 | -0.278055 | 1.8958998 |
| a16 | 0 | 0 | 0 | 0 | -0.0003175 | -0.8995956 |
| a18 | 0 | 0 | 0 | 0 | 0 | 0.1706282 |
| a20 | 0 | 0 | 0 | 0 | 0 | 0 |
| No. | 41 | 42 | 51 | 52 | 61 | 62 |
| K | -1 | -1 | 0 | 0 | 0 | -1 |
| a4 | 0.5256875 | 0.14711 | -0.300817303 | 0.007969198 | -0.098548516 | -0.186296059 |
| a6 | -1.5526987 | -0.5343628 | 0.273653543 | 0.064149575 | 0.058789022 | 0.088498259 |
| a8 | 3.115708 | 0.9814586 | -0.22319018 | -0.107652373 | -0.016853161 | -0.033230783 |
| a10 | -3.9200878 | -0.8811485 | 0.093654341 | 0.068167059 | 0.00407284 | 0.008741611 |
| a12 | 3.3001747 | 0.3934142 | -0.019885212 | -0.023313446 | -0.00080138 | -0.001524024 |
| a14 | -1.7981292 | -0.0193503 | 0.001670409 | 0.004660301 | 9.51512E-05 | 0.00015362 |
| a16 | 0.5677118 | -0.0623611 | -1.33888E-05 | -0.000519715 | -4.7557E-06 | -6.60239E-06 |
| a18 | -0.0790665 | 0.0254091 | 1.18186E-05 | 2.48007E-05 | 4.54927E-09 | 7.47517E-09 |
| a20 | 0 | -0.0031933 | 0 | 0 | 0 | 0 |

FIG. 25

| Sixth Example |||||||
|---|---|---|---|---|---|---|
| EFL(Effective Focal Length)= 3.869 mm., HFOV(Half Field Of View)= 36.98 deg., Total Length=4.801mm., Fno= 2.05 |||||||
| No. | | Curvature Radius | Ape. Stop Distance Lens Thickness Air Gap | Refractive Index | Abbe No. | Focal Length | Material |
| | Object | infinity | infinity | | | | |
| 80 | Ape. Stop | infinity | -0.3232 | | | | |
| 11 | First Lens | 1.5864 | 0.5100 | 1.546 | 56.114 | 3.480 | Plastic |
| 12 | | 8.5305 | 0.0811 | | | | |
| 21 | Second Lens | 2.5650 | 0.2426 | 1.647 | 22.440 | -8.006 | Plastic |
| 22 | | 1.6517 | 0.4299 | | | | |
| 31 | Third Lens | -49.1036 | 0.5566 | 1.546 | 56.114 | 5.454 | Plastic |
| 32 | | -2.8185 | 0.3058 | | | | |
| 41 | Fourth Lens | -1.0032 | 0.3155 | 1.647 | 22.440 | -6.551 | Plastic |
| 42 | | -1.4768 | 0.0610 | | | | |
| 51 | Fifth Lens | 2.5154 | 0.5100 | 1.546 | 56.114 | 3.112 | Plastic |
| 52 | | -4.8589 | 0.1644 | | | | |
| 61 | Sixth Lens | -5.2679 | 0.4942 | 1.546 | 56.114 | -2.635 | Plastic |
| 62 | | 2.0444 | 0.4789 | | | | |
| 72 | Filter | infinity | 0.3000 | | | | |
| | Filter -Image Plane | infinity | 0.3507 | | | | |
| 71 | Image Plane | infinity | 0.0000 | | | | |

FIG. 26

| No. | 11 | 12 | 21 | 22 | 31 | 32 |
|---|---|---|---|---|---|---|
| K | 0 | 0 | 0 | 0 | 0 | 0.612607 |
| a4 | 0.005685 | -0.146454 | -0.300938 | -0.189197 | -0.066763 | -0.021284 |
| a6 | 0.024636 | 0.370167 | 0.513695 | 0.269942 | -0.209185 | -0.175506 |
| a8 | -0.035923 | -0.537623 | -0.662428 | -0.262163 | 0.5919617 | -0.117510 |
| a10 | 0.037941 | 0.460012 | 0.564439 | 0.231223 | -1.0907073 | 1.090077 |
| a12 | -0.008183 | -0.170362 | -0.2357175 | -0.0741315 | 0.9730588 | -2.0591375 |
| a14 | 0 | 0 | 0 | 0 | -0.2844461 | 1.9427514 |
| a16 | 0 | 0 | 0 | 0 | -0.0003224 | -0.9241796 |
| a18 | 0 | 0 | 0 | 0 | 0 | 0.1765996 |
| a20 | 0 | 0 | 0 | 0 | 0 | 0 |
| No. | 41 | 42 | 51 | 52 | 61 | 62 |
| K | -1 | -1 | 0 | 0 | 0 | -1 |
| a4 | 0.537053 | 0.150339 | -0.296050 | 0.011003 | -9.85574E-02 | -1.86542E-01 |
| a6 | -1.570295 | -0.536091 | 0.262307 | 0.064433 | 5.91658E-02 | 8.83451E-02 |
| a8 | 3.160159 | 0.994244 | -0.215745 | -0.109488 | -1.71039E-02 | -3.36850E-02 |
| a10 | -3.991771 | -0.8973506 | 0.092152 | 0.069393 | 4.14804E-03 | 8.91303E-03 |
| a12 | 3.3736086 | 0.4020772 | -0.020721689 | -0.023825 | -8.18561E-04 | -1.55599E-03 |
| a14 | -1.8451606 | -0.0198904 | 0.001934066 | 0.00478656 | 9.77556E-05 | 1.57813E-04 |
| a16 | 0.5850088 | -0.0642625 | 5.51385E-05 | -0.000534799 | -4.90139E-06 | -6.81066E-06 |
| a18 | -0.082028 | 0.0262888 | -7.9606E-06 | 2.55545E-05 | 0 | 0 |
| a20 | 0 | -0.0033143 | 0 | 0 | 0 | 0 |

|  | Example 1 | Example 2 | Example 3 | Example 4 | Example 5 | Example 6 |
|---|---|---|---|---|---|---|
| AG56/(AG12+AG45) | 1.517 | 1.990 | 1.444 | 1.148 | 1.502 | 1.156 |
| T5/T4 | 1.568 | 1.583 | 1.990 | 1.990 | 1.834 | 1.617 |
| T1/AG56 | 2.208 | 1.769 | 2.289 | 2.840 | 2.368 | 3.102 |
| ALT/AAG | 2.353 | 2.213 | 2.371 | 2.539 | 2.174 | 2.522 |
| AG34/T2 | 1.189 | 1.230 | 1.232 | 1.214 | 1.560 | 1.260 |
| ALT/AG56 | 11.416 | 9.039 | 11.928 | 15.094 | 11.741 | 15.991 |
| AG34/(AG12+AG45) | 1.950 | 2.098 | 1.966 | 1.921 | 2.490 | 2.151 |
| T3/T5 | 1.138 | 1.122 | 0.935 | 0.916 | 0.943 | 1.091 |
| AAG/T5 | 2.190 | 2.273 | 1.855 | 1.710 | 2.150 | 2.044 |
| AG34/AG56 | 1.285 | 1.054 | 1.361 | 1.674 | 1.658 | 1.860 |
| T3/AG34 | 1.961 | 1.912 | 1.862 | 1.903 | 1.429 | 1.820 |
| T5/(AG12+AG45) | 3.360 | 3.575 | 3.915 | 3.990 | 3.773 | 3.587 |
| T4/AG34 | 1.099 | 1.076 | 1.001 | 1.044 | 0.826 | 1.032 |
| AG23/T6 | 0.964 | 1.042 | 1.027 | 0.972 | 1.009 | 0.870 |
| T6/T5 | 0.893 | 0.816 | 0.710 | 0.710 | 0.819 | 0.969 |
| AG56/T2 | 0.925 | 1.167 | 0.905 | 0.725 | 0.941 | 0.678 |

OPTICAL IMAGING LENS AND ELECTRONIC DEVICE COMPRISING THE SAME

CROSS REFERENCE TO RELATED APPLICATION

This application claims priority to Taiwan Application No. 103120901, filed on Jun. 17, 2014, the contents of which are hereby incorporated by reference in their entirety for all purposes.

BACKGROUND OF THE INVENTION

1. Field of the Invention

The present invention generally relates to an optical imaging lens set and an electronic device which includes such optical imaging lens set. Specifically speaking, the present invention is directed to an optical imaging lens set of six lens elements and an electronic device which includes such optical imaging lens set.

2. Description of the Prior Art

In recent years, the popularity of mobile phones and digital cameras makes the sizes of various portable electronic products reduce quickly, and so does the size of the photography modules. The current trend of research is to develop an optical imaging lens set of a shorter length with uncompromised good quality. The most important characteristics of an optical imaging lens set are image quality and size.

U.S. Pat. No. 7,830,620 discloses an optical imaging lens set of six lens elements. However, in U.S. Pat. No. 7,830,620, the first lens element has negative refractive power, the second lens element has positive refractive power, and the aperture stop is disposed between the second lens element and the third lens element. This arrangement cannot achieve good optical performance. Besides, the size of the optical imaging lens set is too big to satisfy the specification requirements of consumer electronics products.

Therefore, how to reduce the total length of a photographic device, but still maintain good optical performance, is an important research objective.

SUMMARY OF THE INVENTION

In light of the above, the present invention is capable of proposing an optical imaging lens set that is lightweight, and has a low production cost, reduced length, high resolution and high image quality. The optical imaging lens set of six lens elements of the present invention has a first lens element, a second lens element, a third lens element, a fourth lens element, a fifth lens element and a sixth lens element sequentially from an object side to an image side along an optical axis.

An optical imaging lens includes: a first, second, third, fourth, fifth lens element and sixth lens element, the first lens element has positive refractive power, having a convex object-side surface with a convex part in a vicinity of the optical axis and with a convex part in a vicinity of its periphery, the second lens element has negative refractive power, having an object-side surface with a convex part in a vicinity of its periphery, the third lens element has an image-side surface with a convex part in a vicinity of the optical axis, the fourth lens element has an image-side surface with a convex part in a vicinity of the optical axis, the fifth lens element has an object-side surface with a convex part in a vicinity of the optical axis, and the sixth lens element has an image-side surface with a concave part in a vicinity of its periphery, wherein the optical imaging lens set does not include any lens element with refractive power other than said first, second, third, fourth, fifth lens elements and sixth lens element.

In the optical imaging lens set of six lens elements of the present invention, an air gap AG12 along the optical axis is disposed between the first lens element and the second lens element, an air gap AG23 along the optical axis is disposed between the second lens element and the third lens element, an air gap AG34 along the optical axis is disposed between the third lens element and the fourth lens element, an air gap AG45 along the optical axis is disposed between the fourth lens element and the fifth lens element, an air gap AG56 along the optical axis is disposed between the fifth lens element and the sixth lens element, and the sum of total five air gaps between adjacent lens elements from the first lens element to the sixth lens element along the optical axis is AAG, AAG=AG12+AG23+AG34+AG45+AG56.

In the optical imaging lens set of six lens elements of the present invention, the first lens element has a first lens element thickness T1 along the optical axis, the second lens element has a second lens element thickness T2 along the optical axis, the third lens element has a third lens element thickness T3 along the optical axis, the fourth lens element has a fourth lens element thickness T4 along the optical axis, the fifth lens element has a fifth lens element thickness T5 along the optical axis, the sixth lens element has a sixth lens element thickness T6 along the optical axis, and the total thickness of all the lens elements in the optical imaging lens set along the optical axis is ALT, ALT=T1+T2+T3+T4+T5+T6.

In the optical imaging lens set of six lens elements of the present invention, the relationship $AG56/(AG12+AG45) \leq 2$ is satisfied.

In the optical imaging lens set of six lens elements of the present invention, the relationship $T5/T4 \leq 2.0$ is satisfied.

In the optical imaging lens set of six lens elements of the present invention, the relationship $T1/AG56 \leq 3.2$ is satisfied.

In the optical imaging lens set of six lens elements of the present invention, the relationship $ALT/AAG \leq 2.55$ is satisfied.

In the optical imaging lens set of six lens elements of the present invention, the relationship $AG34/T2 \leq 1.6$ is satisfied.

In the optical imaging lens set of six lens elements of the present invention, the relationship $ALT/AG56 \leq 16$ is satisfied.

In the optical imaging lens set of six lens elements of the present invention, the relationship $AG34/(AG12+AG45) \leq 2.5$ is satisfied.

In the optical imaging lens set of six lens elements of the present invention, the relationship $0.9 \leq T3/T5$ is satisfied.

In the optical imaging lens set of six lens elements of the present invention, the relationship $1.7 \leq AAG/T5$ is satisfied.

In the optical imaging lens set of six lens elements of the present invention, the relationship $AG34/AG56 \leq 2.0$ is satisfied.

In the optical imaging lens set of six lens elements of the present invention, the relationship $1.4 \leq T3/AG34$ is satisfied.

In the optical imaging lens set of six lens elements of the present invention, the relationship $T5/(AG12+AG45) \leq 4.0$ is satisfied.

In the optical imaging lens set of six lens elements of the present invention, the relationship $0.8 \leq T4/AG34$ is satisfied.

In the optical imaging lens set of six lens elements of the present invention, the relationship $0.8 \leq AG23/T6$ is satisfied.

In the optical imaging lens set of six lens elements of the present invention, the relationship $0.7 \leq T6/T5$ is satisfied.

In the optical imaging lens set of six lens elements of the present invention, the relationship $0.6 \leq AG56/T2$ is satisfied.

The present invention also proposes an electronic device which includes the optical imaging lens set as described above. The electronic device includes a case and an image module disposed in the case. The image module includes an optical imaging lens set as described above, a barrel for the installation of the optical imaging lens set, a module housing unit for the installation of the barrel, a substrate for the installation of the module housing unit, and an image sensor disposed on the substrate and at an image side of the optical imaging lens set.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 5 illustrates a third example of the optical imaging lens set of six lens elements of the present invention.

FIG. 6A illustrates the longitudinal spherical aberration on the image plane of the third example.

FIG. 6B illustrates the astigmatic aberration on the sagittal direction of the third example.

FIG. 6C illustrates the astigmatic aberration on the tangential direction of the third example.

FIG. 6D illustrates the distortion aberration of the third example.

FIG. 7 illustrates a fourth example of the optical imaging lens set of six lens elements of the present invention.

FIG. 8A illustrates the longitudinal spherical aberration on the image plane of the fourth example.

FIG. 8B illustrates the astigmatic aberration on the sagittal direction of the fourth example.

FIG. 8C illustrates the astigmatic aberration on the tangential direction of the fourth example.

FIG. 8D illustrates the distortion aberration of the fourth example.

FIG. 9 illustrates a fifth example of the optical imaging lens set of six lens elements of the present invention.

FIG. 10A illustrates the longitudinal spherical aberration on the image plane of the fifth example.

FIG. 10B illustrates the astigmatic aberration on the sagittal direction of the fifth example.

FIG. 10C illustrates the astigmatic aberration on the tangential direction of the fifth example.

FIG. 10D illustrates the distortion aberration of the fifth example.

FIG. 16 shows the optical data of the first example of the optical imaging lens set.

FIG. 17 shows the aspheric surface data of the first example.

FIG. 18 shows the optical data of the second example of the optical imaging lens set.

FIG. 19 shows the aspheric surface data of the second example.

FIG. 20 shows the optical data of the third example of the optical imaging lens set.

FIG. 21 shows the aspheric surface data of the third example.

FIG. 22 shows the optical data of the fourth example of the optical imaging lens set.

FIG. 23 shows the aspheric surface data of the fourth example.

FIG. 24 shows the optical data of the fifth example of the optical imaging lens set.

FIG. 25 shows the aspheric surface data of the fifth example.

FIG. 26 shows the optical data of the sixth example of the optical imaging lens set.

FIG. 27 shows the aspheric surface data of the sixth example.

FIG. 28 shows some important ratios in the examples.

DETAILED DESCRIPTION

Figure 13:
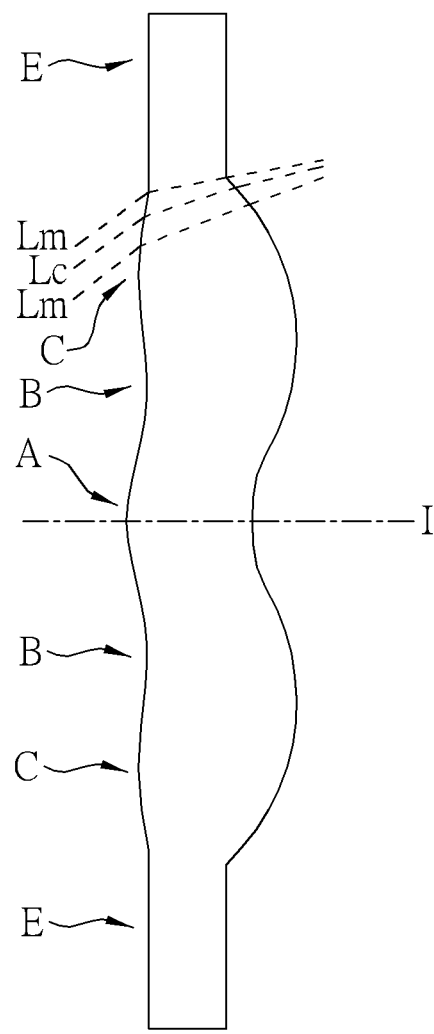
FIG. 13 illustrates exemplificative shapes of the optical imaging lens element of the present invention.

Before the detailed description of the present invention, the first thing to be noticed is that in the present invention, similar (not necessarily identical) elements are labeled as the same numeral references. In the entire present specification, "a certain lens element has negative/positive refractive power" refers to the part in a vicinity of the optical axis of the lens element has negative/positive refractive power. "An object-side/image-side surface of a certain lens element has a concave/convex part" refers to the part is more concave/convex in a direction parallel with the optical axis to be compared with an outer region next to the region. Taking FIG. 13 for example, the optical axis is "I" and the lens element is symmetrical with respect to the optical axis I. The object side of the lens element has a convex part in the region A, a concave part in the region B, and a convex part in the region C because region A is more convex in a direction parallel with the optical axis than an outer region (region B) next to region A, region B is more concave than region C and region C is similarly more convex than region E. "A circular periphery of a certain lens element" refers to a circular periphery region of a surface on the lens element for light to pass through, that is, region C in the drawing. In the drawing, imaging light includes Lc (chief ray) and Lm (marginal ray). "A vicinity of the optical axis" refers to an optical axis region of a surface on the lens element for light to pass through, that is, the region A in FIG. 13. In addition, the lens element may include an extension part E for the lens element to be installed in an optical imaging lens set. Ideally speaking, no light would pass through the extension part, and the actual structure and shape of the extension part is not limited to this and may have other variations. For the reason of simplicity, the extension part is not illustrated in FIGS. 1, 3, 5, 7, 9 and 11.

Figure 1:
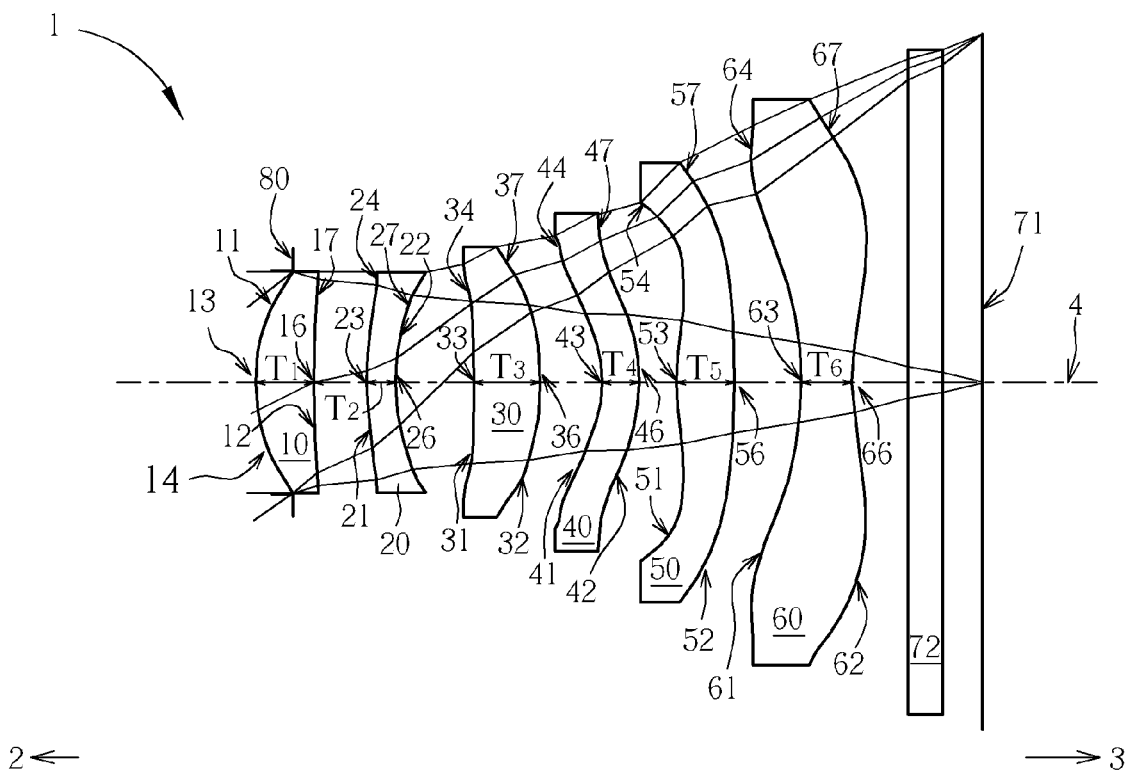
FIG. 1 illustrates a first example of the optical imaging lens set of the present invention.

As shown in FIG. 1, the optical imaging lens set 1 of six lens elements of the present invention, sequentially located from an object side 2 (where an object is located) to an image side 3 along an optical axis 4, has a first lens element 10, a second lens element 20, a third lens element 30, a fourth lens element 40, a fifth lens element 50, a sixth lens element 60, a filter 72 and an image plane 71. There are exclusively six lens elements with refractive power in the optical imaging lens set 1 of the present invention. The optical axis 4 is the optical axis of the entire optical imaging lens set 1, and the optical axis of each of the lens elements coincides with the optical axis of the optical imaging lens set 1.

Furthermore, the optical imaging lens set 1 includes an aperture stop (ape. stop) 80 disposed in an appropriate position. In FIG. 1, the aperture stop 80 is disposed between the object side 2 and the first lens element 10. When light emitted or reflected by an object (not shown) which is located at the object side 2 enters the optical imaging lens set 1 of the present invention, it forms a clear and sharp image on the image plane 71 at the image side 3 after passing through the aperture stop 80, the first lens element 10, the second lens element 20, the third lens element 30, the fourth lens element 40, the fifth lens element 50, the sixth lens element 60 and the filter 72.

In the embodiments of the present invention, the optional filter 72 may be a filter of various suitable functions, for example, the filter 72 may be an infrared cut filter (IR cut filter), placed between the sixth lens element 60 and the image plane 71. The filter 72 is made of glass, without affecting the focal length of the optical lens element system, namely the optical imaging lens set, of the present invention.

Each lens element in the optical imaging lens set 1 of the present invention has an object-side surface facing toward the object side 2 as well as an image-side surface facing toward the image side 3. In addition, each object-side surface and image-side surface in the optical imaging lens set 1 of the present invention has a part in a vicinity of its circular periphery (circular periphery part) away from the optical axis 4 as well as a part in a vicinity of the optical axis (optical axis part) close to the optical axis 4. For example, the first lens element 10 has a first object-side surface 11 and a first image-side surface 12; the second lens element 20 has a second object-side surface 21 and a second image-side surface 22; the third lens element 30 has a third object-side surface 31 and a third image-side surface 32; the fourth lens element 40 has a fourth object-side surface 41 and a fourth image-side surface 42; the fifth lens element 50 has a fifth object-side surface 51 and a fifth image-side surface 52; and the sixth lens element 60 has a sixth object-side surface 61 and a sixth image-side surface 62.

Each lens element in the optical imaging lens set 1 of the present invention further has a central thickness on the optical axis 4. For example, the first lens element 10 has a first lens element thickness T1, the second lens element 20 has a second lens element thickness T2, the third lens element 30 has a third lens element thickness T3, the fourth lens element 40 has a fourth lens element thickness T4, the fifth lens element 50 has a fifth lens element thickness T5, and the sixth lens element 60 has a sixth lens element thickness T6. Therefore, the total thickness of all the lens elements in the optical imaging lens set 1 along the optical axis 4 is ALT=T1+T2+T3+T4+T5+T6.

In addition, between two adjacent lens elements in the optical imaging lens set 1 of the present invention there is an air gap along the optical axis 4. For example, an air gap AG12 is disposed between the first lens element 10 and the second lens element 20, an air gap AG23 is disposed between the second lens element 20 and the third lens element 30, an air gap AG34 is disposed between the third lens element 30 and the fourth lens element 40, an air gap AG45 is disposed between the fourth lens element 40 and the fifth lens element 50, and an air gap AG56 is disposed between the fifth lens element 50 and the sixth lens element 60. Therefore, the sum of total five air gaps between adjacent lens elements from the first lens element 10 to the sixth lens element 60 along the optical axis 4 is AAG, AAG=AG12+AG23+AG34+AG45+AG56.

FIRST EXAMPLE

Please refer to FIG. 1 which illustrates the first example of the optical imaging lens set 1 of the present invention. Please refer to FIG. 2A for the longitudinal spherical aberration on the image plane 71 of the first example; please refer to FIG. 2B for the astigmatic field aberration on the sagittal direction; please refer to FIG. 2C for the astigmatic field aberration on the tangential direction, and please refer to FIG. 2D for the distortion aberration. The Y axis of the spherical aberration in each example is "field of view" for 1.0. The Y axis of the astigmatic field and the distortion in each example stand for "image height". The image height is 2.970 mm.

The optical imaging lens set 1 of the first example has six lens elements 10 to 60; all of the lens elements are made of a plastic material and have refractive power. The optical imaging lens set 1 also has an aperture stop 80, a filter 72, and an image plane 71. The aperture stop 80 is provided between the object side 2 and the first lens element 10. The filter 72 may be used for preventing specific wavelength light (such as the Infrared light) reaching the image plane to adversely affect the imaging quality.

The first lens element 10 has positive refractive power. The first object-side surface 11 facing toward the object side 2 is a convex surface, having a convex part 13 in the vicinity of the optical axis and a convex part 14 in a vicinity of its circular periphery; The first image-side surface 12 facing toward the image side 3 is a concave surface, having a concave part 16 in the vicinity of the optical axis and a concave part 17 in a vicinity of its circular periphery.

The second lens element 20 has negative refractive power. The second object-side surface 21 facing toward the object side 2 is a convex surface, having a convex part 23 in the vicinity of the optical axis and a convex part 24 in a vicinity of its circular periphery; The second image-side surface 22 facing toward the image side 3 is a concave surface, having a concave part 26 in the vicinity of the optical axis and a concave part 27 in a vicinity of its circular periphery.

The third lens element 30 has positive refractive power. The third object-side surface 31 facing toward the object side 2 is a concave surface, having a concave part 33 in the vicinity of the optical axis and a concave part 34 in a vicinity of its circular periphery; The third image-side surface 32 facing toward the image side 3 is a convex surface, having a convex part 36 in the vicinity of the optical axis and a convex part 37 in a vicinity of its circular periphery.

The fourth lens element 40 has negative refractive power. The fourth object-side surface 41 facing toward the object side 2 has a concave part 43 in the vicinity of the optical axis and a concave part 44 in a vicinity of its circular periphery; the fourth image-side surface 42 facing toward the image side 3 has a convex part 46 in the vicinity of the optical axis and a convex part 47 in a vicinity of its circular periphery The fifth lens element 50 has positive refractive power. The fifth object-side surface 51 facing toward the object side 2 has a convex part 53 in the vicinity of the optical axis and a concave part 54 in a vicinity of its circular periphery; The fifth image-side surface 52 facing toward the image side 3 is a convex surface, having a convex part 56 in the vicinity of the optical axis and a convex part 57 in a vicinity of its circular periphery.

The sixth lens element 60 has negative refractive power. The sixth object-side surface 61 facing toward the object side 2 has a concave part 63 in the vicinity of the optical axis and a convex part 64 in a vicinity of its circular periphery; The sixth image-side surface 62 facing toward the image side 3 has a concave part 66 in the vicinity of the optical axis and a convex part 67 in a vicinity of its circular periphery. The filter 72 may be disposed between the sixth lens element 60 and the image plane 71.

In the optical imaging lens element 1 of the present invention, the object-side surfaces 11/21/31/41/51/61 and image-side surfaces 12/22/32/42/52/62 are all aspherical. These aspheric coefficients are defined according to the following formula:

$$Z(Y) = \frac{Y^2}{R} \bigg/ \left(1 + \sqrt{1-(1+K)\frac{Y^2}{R^2}}\right) + \sum_{i=1}^{n} a_{2i} \times Y^{2i}$$

In which:

R represents the curvature radius of the lens element surface;

Z represents the depth of an aspherical surface (the perpendicular distance between the point of the aspherical surface at a distance Y from the optical axis and the tangent plane of the vertex on the optical axis of the aspherical surface);

Y represents a vertical distance from a point on the aspherical surface to the optical axis;

K is a conic constant; $a_{2i}$ is the aspheric coefficient of the 2i order.

The optical data of the first example of the optical imaging lens set 1 are shown in FIG. 16 while the aspheric surface data are shown in FIG. 17. In the present examples of the optical imaging lens set, the f-number of the entire optical lens element system is Fno, HFOV stands for the half field of view which is half of the field of view of the entire optical lens element system, and the unit for the curvature radius, the thickness and the focal length is in millimeters (mm). The length of the optical imaging lens set (the distance from the first object-side surface 11 of the first lens element 10 to the image plane 71) is 4.773 mm. The image height is 2.970 mm, HFOV is 37.18 degrees. Some important ratios of the first example are as follows:

AG56/(AG12+AG45)=1.517
T5/T4=1.568
T1/AG56=2.208
ALT/AAG=2.353
AG34/T2=1.189
ALT/AG56=11.416
AG34/(AG12+AG45)=1.950
T3/T5=1.138
AAG/T5=2.190
AG34/AG56=1.285
T3/AG34=1.961
T5/(AG12+AG45)=3.360
T4/AG34=1.099
AG23/T6=0.964
T6/T5=0.893
AG56/T2=0.925

SECOND EXAMPLE

Figure 3:
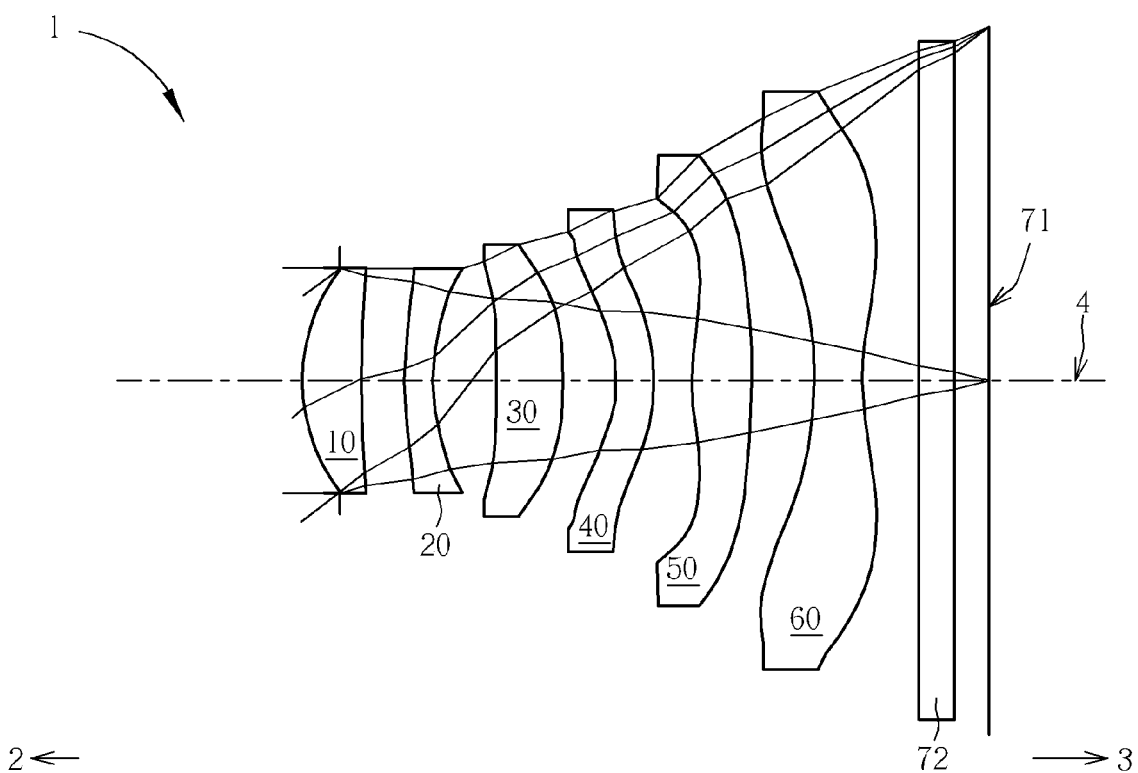
FIG. 3 illustrates a second example of the optical imaging lens set of six lens elements of the present invention.
Figures 4A, 4B, 4C, 4D:
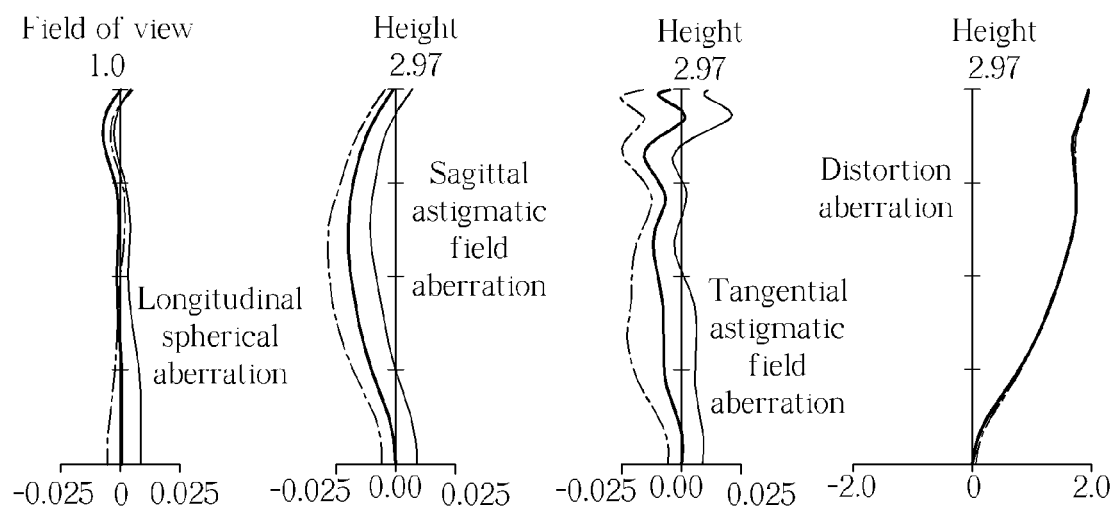
FIG. 4A illustrates the longitudinal spherical aberration on the image plane of the second example.
FIG. 4B illustrates the astigmatic aberration on the sagittal direction of the second example.
FIG. 4C illustrates the astigmatic aberration on the tangential direction of the second example.
FIG. 4D illustrates the distortion aberration of the second example.

Please refer to FIG. 3 which illustrates the second example of the optical imaging lens set 1 of the present invention. It is noted that from the second example to the following examples, in order to simplify the figures, only the components different from what the first example has and the basic lens elements will be labeled in figures. Others components that are the same as what the first example has, such as the object-side surface, the image-side surface, the part in a vicinity of the optical axis and the part in a vicinity of its circular periphery will be omitted in the following example. Please refer to FIG. 4A for the longitudinal spherical aberration on the image plane 71 of the second example; please refer to FIG. 4B for the astigmatic aberration on the sagittal direction; please refer to FIG. 4C for the astigmatic aberration on the tangential direction, and please refer to FIG. 4D for the distortion aberration. The components in the second example are similar to those in the first example, but the optical data such as the curvature radius, the refractive power, the lens thickness, the lens focal length, the aspheric surface or the back focal length in this example are different from the optical data in the first example. The optical data of the second example of the optical imaging lens set are shown in FIG. 18 while the aspheric surface data are shown in FIG. 19. The length of the optical imaging lens set is 4.748 mm. The image height is 2.970 mm, HFOV is 37.28 degrees. Some important ratios of the second example are as follows:

AG56/(AG12+AG45)=1.990
T5/T4=1.583
T1/AG56=1.769
ALT/AAG=2.213
AG34/T2=1.230
ALT/AG56=9.039
AG34/(AG12+AG45)=2.098
T3/T5=1.122
AAG/T5=2.273
AG34/AG56=1.054
T3/AG34=1.912
T5/(AG12+AG45)=3.575
T4/AG34=1.076
AG23/T6=1.042
T6/T5=0.816
AG56/T2=1.167

THIRD EXAMPLE

Please refer to FIG. 5 which illustrates the third example of the optical imaging lens set 1 of the present invention. Please refer to FIG. 6A for the longitudinal spherical aberration on the image plane 71 of the third example; please refer to FIG. 6B for the astigmatic aberration on the sagittal direction; please refer to FIG. 6C for the astigmatic aberration on the tangential direction, and please refer to FIG. 6D for the distortion aberration. The components in the third example are similar to those in the first example, but the optical data such as the curvature radius, the refractive power, the lens thickness, the lens focal length, the aspheric surface or the back focal length in this example are different from the optical data in the first example. The optical data of the third example of the optical imaging lens set are shown in FIG. 20 while the aspheric surface data are shown in FIG. 21. The length of the optical imaging lens set is 4.766 mm. The image height is 2.970 mm, HFOV is 37.19 degrees. Some important ratios of the third example are as follows:
AG56/(AG12+AG45)=1.444
T5/T4=1.990
T1/AG56=2.289
ALT/AAG=2.371
AG34/T2=1.232
ALT/AG56=11.928
AG34/(AG12+AG45)=1.966
T3/T5=0.935
AAG/T5=1.855
AG34/AG56=1.361
T3/AG34=1.862
T5/(AG12+AG45)=3.915
T4/AG34=1.001
AG23/T6=1.027
T6/T5=0.710
AG56/T2=0.905

FOURTH EXAMPLE

Please refer to FIG. 7 which illustrates the fourth example of the optical imaging lens set 1 of the present invention. Please refer to FIG. 8A for the longitudinal spherical aberration on the image plane 71 of the fourth example; please refer to FIG. 8B for the astigmatic aberration on the sagittal direction; please refer to FIG. 8C for the astigmatic aberration on the tangential direction, and please refer to FIG. 8D for the distortion aberration. The components in the fourth example are similar to those in the first example, but the optical data such as the curvature radius, the refractive power, the lens thickness, the lens focal length, the aspheric surface or the back focal length in this example are different from the optical data in the first example. The optical data of the fourth example of the optical imaging lens set are shown in FIG. 22 while the aspheric surface data are shown in FIG. 23. The length of the optical imaging lens set is 4.769 mm. The image height is 2.970 mm, HFOV is 37.28 degrees. Some important ratios of the fourth example are as follows:
AG56/(AG12+AG45)=1.148
T5/T4=1.990
T1/AG56=2.840
ALT/AAG=2.539
AG34/T2=1.214
ALT/AG56=15.094
AG34/(AG12+AG45)=1.921
T3/T5=0.916
AAG/T5=1.710
AG34/AG56=1.674
T3/AG34=1.903
T5/(AG12+AG45)=3.990
T4/AG34=1.044
AG23/T6=0.972
T6/T5=0.710
AG56/T2=0.725

FIFTH EXAMPLE

Please refer to FIG. 9 which illustrates the fifth example of the optical imaging lens set 1 of the present invention. Please refer to FIG. 10A for the longitudinal spherical aberration on the image plane 71 of the fifth example; please refer to FIG. 10B for the astigmatic aberration on the sagittal direction; please refer to FIG. 10C for the astigmatic aberration on the tangential direction, and please refer to FIG. 10D for the distortion aberration. The components in the fifth example are similar to those in the first example, but the optical data such as the curvature radius, the refractive power, the lens thickness, the lens focal length, the aspheric surface or the back focal length in this example are different from the optical data in the first example. The optical data of the fifth example of the optical imaging lens set are shown in FIG. 24 while the aspheric surface data are shown in FIG. 25. The length of the optical imaging lens set is 4.751 mm. The image height is 2.970 mm, HFOV is 37.00 degrees. Some important ratios of the fifth example are as follows:
AG56/(AG12+AG45)=1.502
T5/T4=1.834
T1/AG56=2.368
ALT/AAG=2.174
AG34/T2=1.560
ALT/AG56=11.741
AG34/(AG12+AG45)=2.490
T3/T5=0.943
AAG/T5=2.150
AG34/AG56=1.658
T3/AG34=1.429
T5/(AG12+AG45)=3.773
T4/AG34=0.826
AG23/T6=1.009
T6/T5=0.819
AG56/T2=0.941

SIXTH EXAMPLE

Figure 11:
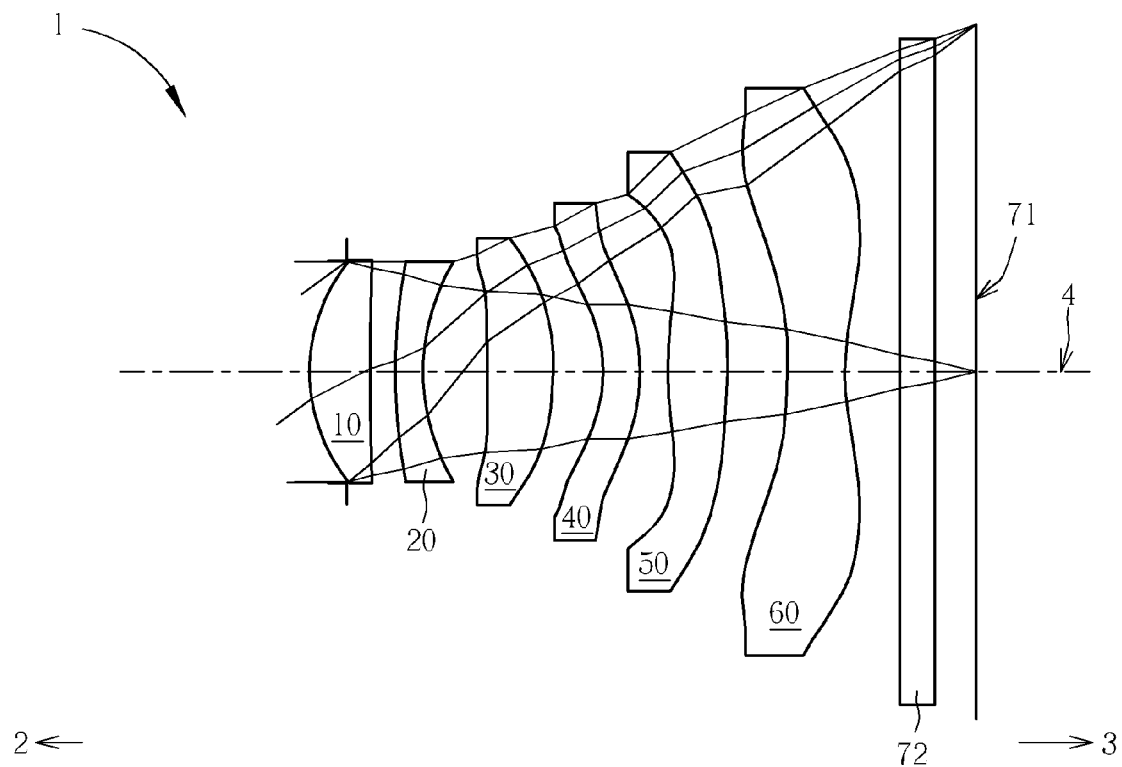
FIG. 11 illustrates a sixth example of the optical imaging lens set of six lens elements of the present invention.
Figures 12A, 12B, 12C, 12D:
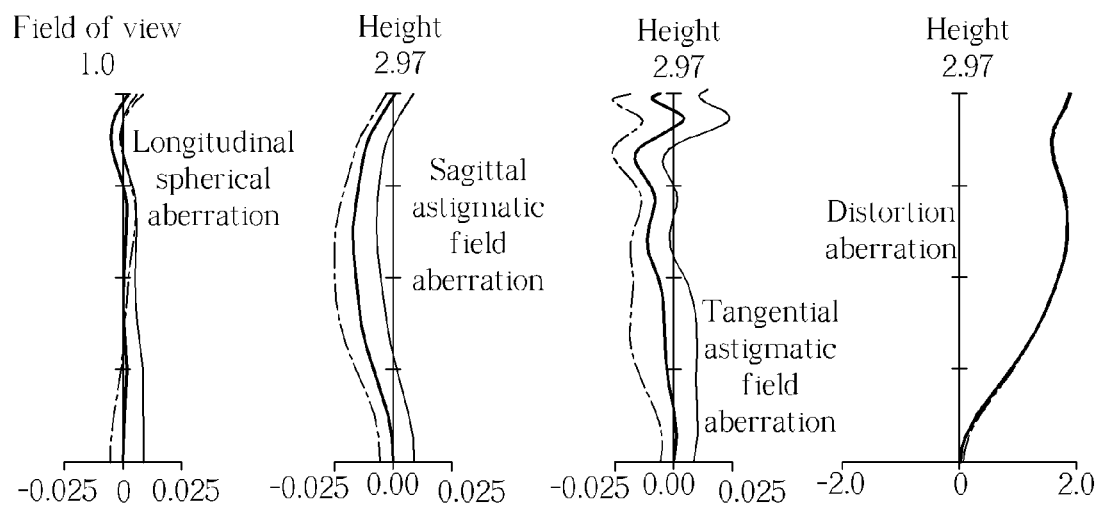
FIG. 12A illustrates the longitudinal spherical aberration on the image plane of the sixth example.
FIG. 12B illustrates the astigmatic aberration on the sagittal direction of the sixth example.
FIG. 12C illustrates the astigmatic aberration on the tangential direction of the sixth example.
FIG. 12D illustrates the distortion aberration of the sixth example.

Please refer to FIG. 11 which illustrates the sixth example of the optical imaging lens set 1 of the present invention. Please refer to FIG. 12A for the longitudinal spherical aberration on the image plane 71 of the sixth example; please refer to FIG. 12B for the astigmatic aberration on the sagittal direction; please refer to FIG. 12C for the astigmatic aberration on the tangential direction, and please refer to FIG. 12D for the distortion aberration. The components in the sixth example are similar to those in the first example, but the optical data such as the curvature radius, the refractive power, the lens thickness, the lens focal length, the aspheric surface or the back focal length in this example are different from the optical data in the first example. The optical data of the sixth example of the optical imaging lens set are shown in FIG. 26 while the aspheric surface data are shown in FIG. 27. The length of the optical imaging lens set is 4.801 mm. The image height is 2.970 mm, HFOV is 36.98 degrees. Some important ratios of the sixth example are as follows:
AG56/(AG12+AG45)=1.156
T5/T4=1.617
T1/AG56=3.102
ALT/AAG=2.522
AG34/T2=1.260
ALT/AG56=15.991
AG34/(AG12+AG45)=2.151
T3/T5=1.091
AAG/T5=2.044
AG34/AG56=1.860
T3/AG34=1.820
T5/(AG12+AG45)=3.587
T4/AG34=1.032
AG23/T6=0.870

T6/T5=0.969

AG56/T2=0.678

Some important ratios in each example are shown in FIG. 28. In light of the above examples, the inventors observe the following features:

1. Take the first embodiment as an example, in FIG. 2A, the curves of different wavelength are very close to each other, which means all of the off-axis light is focused on the vicinity of the imaging point, and the deviation between each off-axis light and the imaging point is ±0.02 mm, so the spherical aberration has been improved significantly. Besides, since the different curves are close to each other, the imaging positions of different wavelengths are close to each other too, improving chromatic aberration.

Figures 2A, 2B, 2C, 2D:
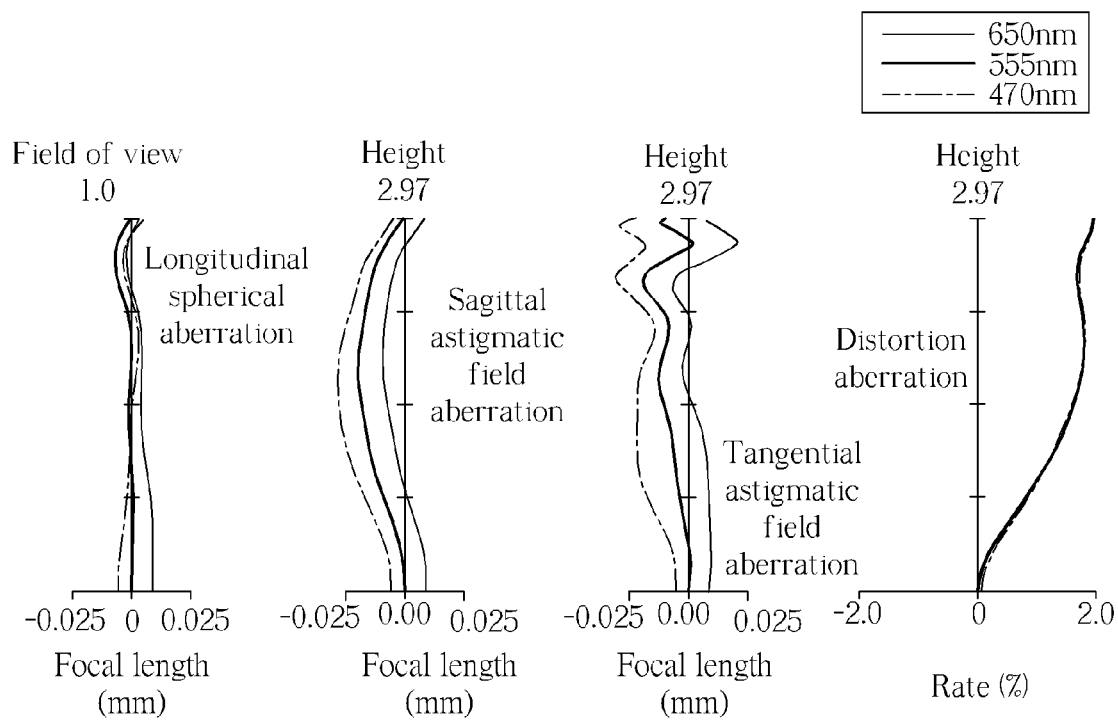
FIG. 2A illustrates the longitudinal spherical aberration on the image plane of the first example.
FIG. 2B illustrates the astigmatic aberration on the sagittal direction of the first example.
FIG. 2C illustrates the astigmatic aberration on the tangential direction of the first example.
FIG. 2D illustrates the distortion aberration of the first example.

2. As shown in FIG. 2B and FIG. 2C, the focus in the whole view region of three different wavelengths is between ±0.03 mm, which means the optical imaging lens set of the first embodiment can eliminate the aberrations effectively. Furthermore, the distance between the curves is very small, meaning that the dispersion on the axis has greatly improved too. Please refer to FIG. 2D. The distortion aberration of the first embodiment is maintained in the range of ±2.0%, which means it has achieved the quality requirements of the imaging optical system, compared to conventional optical imaging lens sets; the total length of the present invention has been shrunk to about 4.8 mm, and overcomes chromatic aberration and provides better image quality. In summary, the first embodiment of the present invention has shorter length and larger HFOV, but still maintains good optical performance.

3. The first lens element has positive refractive power, to provide the needed refractive power for the optical imaging lens set. The second lens element has negative refractive power, to correct aberration; in addition. Besides, the first object-side surface of the first lens element has a convex part in a vicinity of the optical axis and a convex part in a vicinity of its circular periphery can help to collect the image light; the second object-side surface of the second lens element has a convex part in a vicinity of its circular periphery, the third image-side surface of the third lens element has a convex part in a vicinity of the optical axis, the fourth image-side surface of the fourth lens element has a convex part in a vicinity of the optical axis, the fifth object-side surface of the fifth lens element has a convex part in a vicinity of the optical axis, and the sixth image-side surface of the sixth lens element has a concave part in a vicinity of the optical axis, where each of the surfaces matches each other, in order to improve the aberration and to enlarge the field of view.

In addition, the inventors discover that there are some better ratio ranges for different data according to the above various important ratios. Better ratio ranges help the designers to design the better optical performance and an effectively reduced length of a practically possible optical imaging lens set. For example:

$$AG56/(AG12+AG45)\leq 2.0 \text{、} AG34/(AG12+AG45)\leq 2.5 \text{、} T5/(AG12+AG45)\leq 4.0: \quad (1)$$

AG12 is an air gap between said first lens element and second lens element along the optical axis. AG45 is an air gap between said fourth lens element and said fifth lens element along the optical axis. Since AG12 usually to be designed small in conventional technology, and AG45 is disposed between two adjacent convex surface, so AG45 is relatively small. If AG12 and AG45 can be maintained in a relatively large value, the assembly difficulties can be decreased according. Besides, AG56, AG34 and T5 are preferably small. Therefore, AG56/(AG12+AG45), AG34/(AG12+AG45) and T5/(AG12+AG45) should preferably be small. Preferably, if the relationship AG56/(AG12+AG45)≤2.0 is satisfied, ideally, it is suggested that the range may be 1.0~2.0; if the relationship AG34/(AG12+AG45)≤2.5 is satisfied, ideally, it is suggested that the range may be 1.5~2.5; if the relationship T5/(AG12+AG45)≤4.0 is satisfied, ideally, it is suggested that the range may be 2.5~4.0.

$$AG23/T6\leq 0.8: \quad (2)$$

AG23 is an air gap between said second lens element and said third lens element along the optical axis. If AG23 can be maintained in a suitable value, the image light passed through the second lens element to the third lens element will have enough space to be adjusted, and the image performance can be increased. In addition, decreasing T6 can help for shrinking the total length of the optical imaging lens set, therefore, AG23/T6 should preferably be large. If the relationship AG23/T6≤0.8 is satisfied, ideally, it is suggested that the range may be 0.8~1.2.

$$ALT/AAG\leq 2.55 \text{、} AAG/T5\geq 1.7: \quad (3)$$

AAG is the sum of total five air gaps between adjacent lens elements from the first lens element to the sixth lens element along the optical axis, as mentioned above, AG12, AG23 and AG45 should be maintained in a relatively large value, so AAG is relatively large too. Therefore, ALT/AAG should preferably be small, and AAG/T5 should preferably be large. If the relationship ALT/AAG≤2.55 is satisfied, ideally, it is suggested that the range may be 1.8~2.55; If the relationship AAG/T5≥1.7 is satisfied, ideally, it is suggested that the range may be 1.7~2.5.

$$AG34/T2\leq 1.6 \text{、} T3/AG34\geq 1.4 \text{、} T4/AG34\geq 0.8: \quad (4)$$

AG34 is an air gap between said third lens element and said fourth lens element along the optical axis. T2, T3 T4 are the thickness of the second lens element, the third lens element and the fourth lens element along said optical axis respectively. Decreasing those parameters mentioned above can help for shrinking the total length of the optical imaging lens set, but considering the difficulties of during the manufacturing process, T2, T3 and T4 cannot be shrunk effectively, but AG34 can be shrunk compared with T2, T3 and T4. Therefore, AG34/T2 should preferably be small, and T3/AG34, T4/AG34 should preferably be large. If the relationship AG34/T2≤1.6 is satisfied, ideally, it is suggested that the range may be 0.8~1.6; If the relationship T3/AG34≥1.4 is satisfied, ideally, it is suggested that the range may be 1.4~2.2; If the relationship T4/AG34≥0.8 is satisfied, ideally, it is suggested that the range may be 0.8~1.2.

$$T5/T4\leq 2.0 \text{、} T3/T5\geq 0.9 \text{、} T6/T5\geq 0.7: \quad (5)$$

T4, T5, and T6 are the thickness of the fourth lens element, the fifth lens element, and the sixth lens element along said optical axis respectively. Those parameters should be maintained within a suitable value range. Otherwise, the total length cannot be thinned if one lens element has too big central thickness, or it's difficult to manufacture the optical imaging lens set if one lens element has too small central thickness. If the relationship T5/T4≤2.0 is satisfied, ideally, it is suggested that the range may be 1.4~2.0; If the relationship T3/T5≥0.9 is satisfied, ideally, it is suggested that the range may be 0.9~1.3; If the relationship T6/T5≥0.7 is satisfied, ideally, it is suggested that the range may be 0.7~1.2.

$$T1/AG56\leq 3.2 \text{、} ALT/AG56\leq 16 \text{、} AG34/AG56\leq 2.0 \text{、} AG56/T2\geq 0.6: \quad (6)$$

AG56 is an air gap between said fifth lens element and sixth lens element along the optical axis. AG56 should be maintained within a relatively large value, otherwise it's difficult to manufacture the optical imaging lens set. Therefore, T1/AG56, ALT/AG56, AG34/AG56 should preferably be small, and AG56/T2 should preferably be large. If the relationship T1/AG56≤3.2 is satisfied, ideally, it is suggested that the range may be 1.5~3.2; If the relationship ALT/AG56≤16 is satisfied, ideally, it is suggested that the range may be 8~16; If the relationship AG34/AG56≤2.0 is satisfied, ideally, it is suggested that the range may be 0.8~2.0; If the relationship AG56/T2≥0.6 is satisfied, ideally, it is suggested that the range may be 0.6~1.5.

Figure 14:
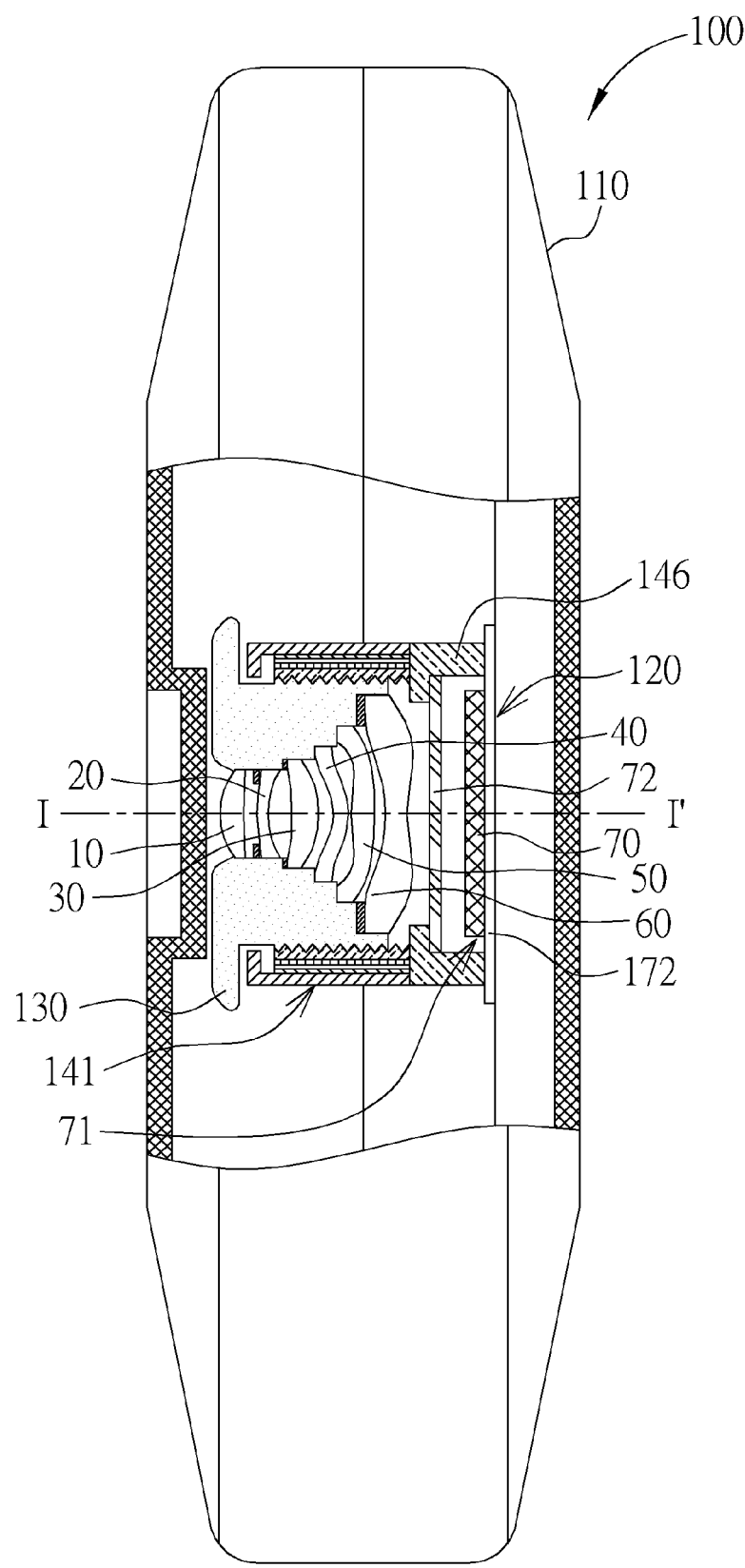
FIG. 14 illustrates a first preferred example of the portable electronic device with an optical imaging lens set of the present invention.

The optical imaging lens set 1 of the present invention may be applied to an electronic device, such as mobile phones or driving recorders. Please refer to FIG. 14. FIG. 14 illustrates a first preferred example of the optical imaging lens set 1 of the present invention for use in a portable electronic device 100. The electronic device 100 includes a case 110, and an image module 120 mounted in the case 110. A mobile phone is illustrated in FIG. 14 as an example, but the electronic device 100 is not limited to a mobile phone.

As shown in FIG. 14, the image module 120 includes the optical imaging lens set 1 as described above. FIG. 14 illustrates the aforementioned first example of the optical imaging lens set 1. In addition, the portable electronic device 100 also contains a barrel 130 for the installation of the optical imaging lens set 1, a module housing unit 140 for the installation of the barrel 130, a substrate 172 for the installation of the module housing unit 140 and an image sensor 70 disposed at the substrate 172, and at the image side 3 of the optical imaging lens set 1. The image sensor 70 in the optical imaging lens set 1 may be an electronic photosensitive element, such as a charge coupled device or a complementary metal oxide semiconductor element. The image plane 71 forms at the image sensor 70.

The image sensor 70 used here is a product of chip on board (COB) package rather than a product of the conventional chip scale package (CSP) so it is directly attached to the substrate 172, and protective glass is not needed in front of the image sensor 70 in the optical imaging lens set 1, but the present invention is not limited to this.

To be noticed in particular, the optional filter 72 may be omitted in other examples although the optional filter 72 is present in this example. The case 110, the barrel 130, and/or the module housing unit 140 may be a single element or consist of a plurality of elements, but the present invention is not limited to this.

Each one of the six lens elements 10, 20, 30, 40, 50 and 60 with refractive power is installed in the barrel 130 with air gaps disposed between two adjacent lens elements in an exemplary way. The module housing unit 140 has a lens element housing 141, and an image sensor housing 146 installed between the lens element housing 141 and the image sensor 70. However in other examples, the image sensor housing 146 is optional. The barrel 130 is installed coaxially along with the lens element housing 141 along the axis I-I', and the barrel 130 is provided inside of the lens element housing 141.

Figure 15:
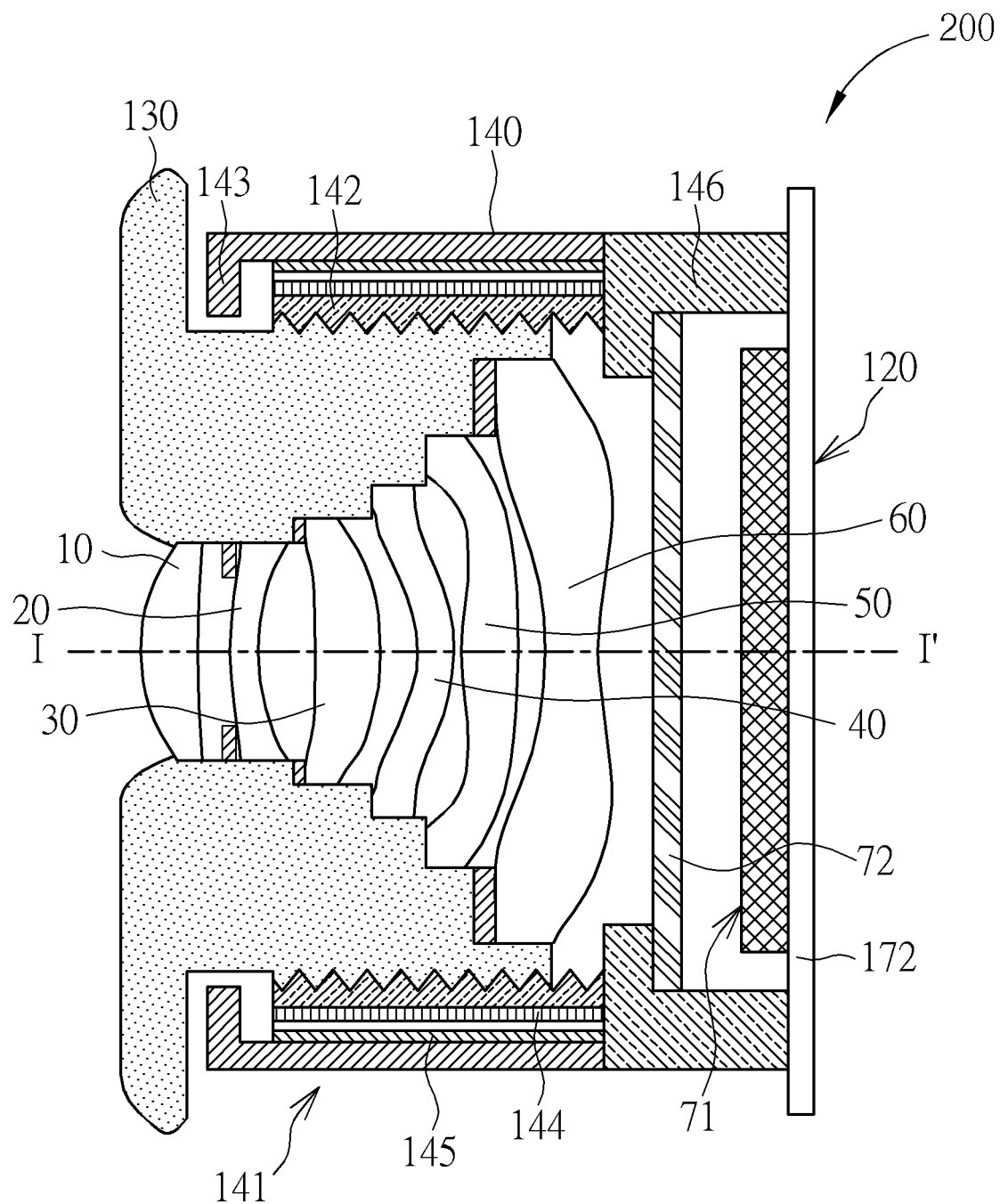
FIG. 15 illustrates a second preferred example of the portable electronic device with an optical imaging lens set of the present invention.

Please also refer to FIG. 15 for another application of the aforementioned optical imaging lens set 1 in a portable electronic device 200 in the second preferred example. The main differences between the portable electronic device 200 in the second preferred example and the portable electronic device 100 in the first preferred example are: the lens element housing 141 has a first seat element 142, a second seat element 143, a coil 144 and a magnetic component 145. The first seat element 142 is for the installation of the barrel 130, exteriorly attached to the barrel 130 and disposed along the axis I-I'. The second seat element 143 is disposed along the axis I-I' and surrounds the exterior of the first seat element 142. The coil 144 is provided between the outside of the first seat element 142 and the inside of the second seat element 143. The magnetic component 145 is disposed between the outside of the coil 144 and the inside of the second seat element 143.

The first seat element 142 may pull the barrel 130 and the optical imaging lens set 1 which is disposed inside of the barrel 130 to move along the axis I-I', namely the optical axis 4 in FIG. 1. The image sensor housing 146 is attached to the second seat element 143. The filter 72, such as an infrared filter, is installed at the image sensor housing 146. Other details of the portable electronic device 200 in the second preferred example are similar to those of the portable electronic device 100 in the first preferred example so they are not elaborated again.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical imaging lens set, from an object side toward an image side in order along an optical axis comprising: a first lens element, a second lens element, a third lens element, a fourth lens element, a fifth lens element and a sixth lens element, said first to sixth lens elements having an object-side surface facing toward the object side as well as an image-side surface facing toward the image side, wherein:

each of the object-side surfaces and the image-side surfaces has a vicinity of the optical axis along the optical axis and a vicinity of its periphery not along the optical axis;

the first lens element has positive refractive power, having a convex object-side surface with a convex part in the vicinity of the optical axis and with a convex part in the vicinity of its periphery;

the second lens element has negative refractive power, having an object-side surface with a convex part in the vicinity of its periphery;

the third lens element has an image-side surface with a convex part in the vicinity of the optical axis;

the fourth lens element has an image-side surface with a convex part in the vicinity of the optical axis;

the fifth lens element has an object-side surface with a convex part in the vicinity of the optical axis; and the sixth lens element has an image-side surface with a concave part in the vicinity of the optical axis;

the optical imaging lens set does not include any lens element with refractive power other than said first lens element, second lens element, third lens element, fourth lens element, fifth lens element and sixth lens element, in addition, an air gap AG12 between said first lens elements and said second lens element along said optical axis, and an air gap AG45 between said fourth lens elements and said fifth lens element along said optical axis, an air gap AG56 between said fifth lens elements and said sixth lens element along said optical axis, a thickness T5 of said fifth lens element along said optical axis, and a thickness T4 of said fourth lens element along said optical axis satisfy the relationships AG56/(AG12+AG45) ≤2 and T5/T4 ≤2.0.

2. The optical imaging lens set of claim 1, wherein an air gap AG34 between said third lens elements and said fourth lens element along said optical axis, and a thickness T2 of said second lens element along said optical axis satisfy a relationship AG34/T2 ≤1.6.

3. The optical imaging lens set of claim 2, wherein a total thickness ALT of said first lens element, said second lens element, said third lens element, said fourth lens element, said fifth lens element and said sixth lens element along said optical axis satisfies a relationship ALT/AG56 ≤16.

4. The optical imaging lens set of claim 1, wherein an air gap AG34 between said third lens elements and said fourth lens element along said optical axis satisfies a relationship AG34/(AG12+AG45) ≤2.5.

5. The optical imaging lens set of claim 4, wherein a thickness T3 of said third lens element along said optical axis, satisfies a relationship 0.9≤T3/T5.

6. The optical imaging lens set of claim 1, wherein the sum of all five air gaps AAG between each lens element from said first lens element to said sixth lens element along the optical axis, satisfies a relationship 1.7≤AAG/T5.

7. The optical imaging lens set of claim 6, wherein an air gap AG34 between said third lens elements and said fourth lens element along said optical axis satisfies a relationship AG34/AG56 ≤2.0.

8. The optical imaging lens set of claim 6, wherein an air gap AG34 between said third lens elements and said fourth lens element along said optical axis, and a thickness T3 of said third lens element along said optical axis satisfy a relationship 1.4≤T3/AG34.

9. The optical imaging lens set of claim 1, further satisfying a relationship T5/(AG12+AG45) ≤4.0.

10. The optical imaging lens set of claim 9, wherein an air gap AG34 between said third lens elements and said fourth lens element along said optical axis satisfies a relationship 0.8≤T4/AG34.

11. The optical imaging lens set of claim 9, wherein an air gap AG23 between said second lens elements and said third lens element along said optical axis, and a thickness T6 of said sixth lens element along said optical axis satisfy a relationship 0.8≤AG23/T6.

12. The optical imaging lens set of claim 1, wherein the third lens element has an object-side surface with a concave part in the vicinity of the optical axis, a thickness T6 of said sixth lens element along said optical axis satisfies a relationship 0.7≤T6/T5.

13. The optical imaging lens set of claim 12, wherein a thickness T2 of said second lens element along said optical axis satisfies a relationship 0.6≤AG56/T2.

14. An electronic device, comprising:
a case; and
an image module disposed in said case and comprising:
an optical imaging lens set of claim 1;
a barrel for the installation of said optical imaging lens set;
a module housing unit for the installation of said barrel;
a substrate for the installation of said module housing unit; and
an image sensor disposed on the substrate and disposed at an image side of said optical imaging lens set.

15. The optical imaging lens set of claim 2, wherein a thickness T1 of said first lens element along said optical axis satisfies a relationship T1/AG56 ≤3.2.

16. The optical imaging lens set of claim 2, wherein a total thickness ALT of said first lens element, said second lens element, said third lens element, said fourth lens element, said fifth lens element and said sixth lens element along said optical axis, and the sum of all five air gaps AAG between each lens element from said first lens element to said sixth lens element along the optical axis satisfy a relationship ALT/AAG ≤2.55.

* * * * *